(12) United States Patent  
Yoshikawa et al.

(10) Patent No.: US 7,416,353 B2
(45) Date of Patent: Aug. 26, 2008

(54) HEAT DISSIPATING MECHANISM OF A PLUGGABLE OPTICAL TRANSCEIVER

(75) Inventors: Satoshi Yoshikawa, Yokohama (JP); Hidemi Sone, Yokohama (JP); Hiromi Kurashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/242,148

(22) Filed: Oct. 4, 2005

(65) Prior Publication Data

US 2006/0093287 A1 May 4, 2006

Related U.S. Application Data

(60) Provisional application No. 60/652,846, filed on Feb. 15, 2005, provisional application No. 60/632,937, filed on Dec. 6, 2004, provisional application No. 60/620,325, filed on Oct. 21, 2004, provisional application No. 60/615,587, filed on Oct. 5, 2004.

(51) Int. Cl.
*G02B 6/36* (2006.01)
*G02B 6/12* (2006.01)

(52) U.S. Cl. .......................... 385/92; 385/14
(58) Field of Classification Search ................ 385/92, 385/14
See application file for complete search history.

(56) References Cited

U.S. PATENT DOCUMENTS 5,325,455 A * 6/1994 Henson et al. ............... 385/89
6,439,918 B1 8/2002 Togami et al.
6,483,902 B1 * 11/2002 Stewart et al. ............ 379/90.01
7,125,261 B2 * 10/2006 Yoshikawa et al. ......... 439/76.1
2003/0142917 A1 7/2003 Merrick
2005/0276547 A1 * 12/2005 Wang et al. .................... 385/92
2005/0286838 A1 * 12/2005 Oki et al. ....................... 385/92

* cited by examiner

Primary Examiner—Kianni C Kaveh
(74) Attorney, Agent, or Firm—Smith, Gambrell & Russell, LLP

(57) ABSTRACT

The optical transceiver of the present invention is one type of the pluggable transceiver that is inserted into/extracted from the cage in the host system. The transceiver includes the OSA (Optical Sub-Assembly) unit, which shows the optical function, and the body unit installing the electronic circuit. The OSA unit includes the receptacle member, the tab plate and transmitting/receiving sub-assemblies. The body unit includes the base installing the circuit board, the heat conducting plate to conduct heat generated by the IC on the substrate to the rear end of the transceiver, the supplementary substrate, the supporting plate, and the cover for putting these components therein. In the present transceiver, the heat is effectively conducted to the rear end thereof the heat conducting plate, besides, the tab plate, the heat conducting plate, and the supporting plate are made only by cutting, bending and tapping without any welding and gluing. Therefore, the present invention may provide an optical pluggable transceiver with superior heat dissipating function by cost saved configuration.

8 Claims, 15 Drawing Sheets

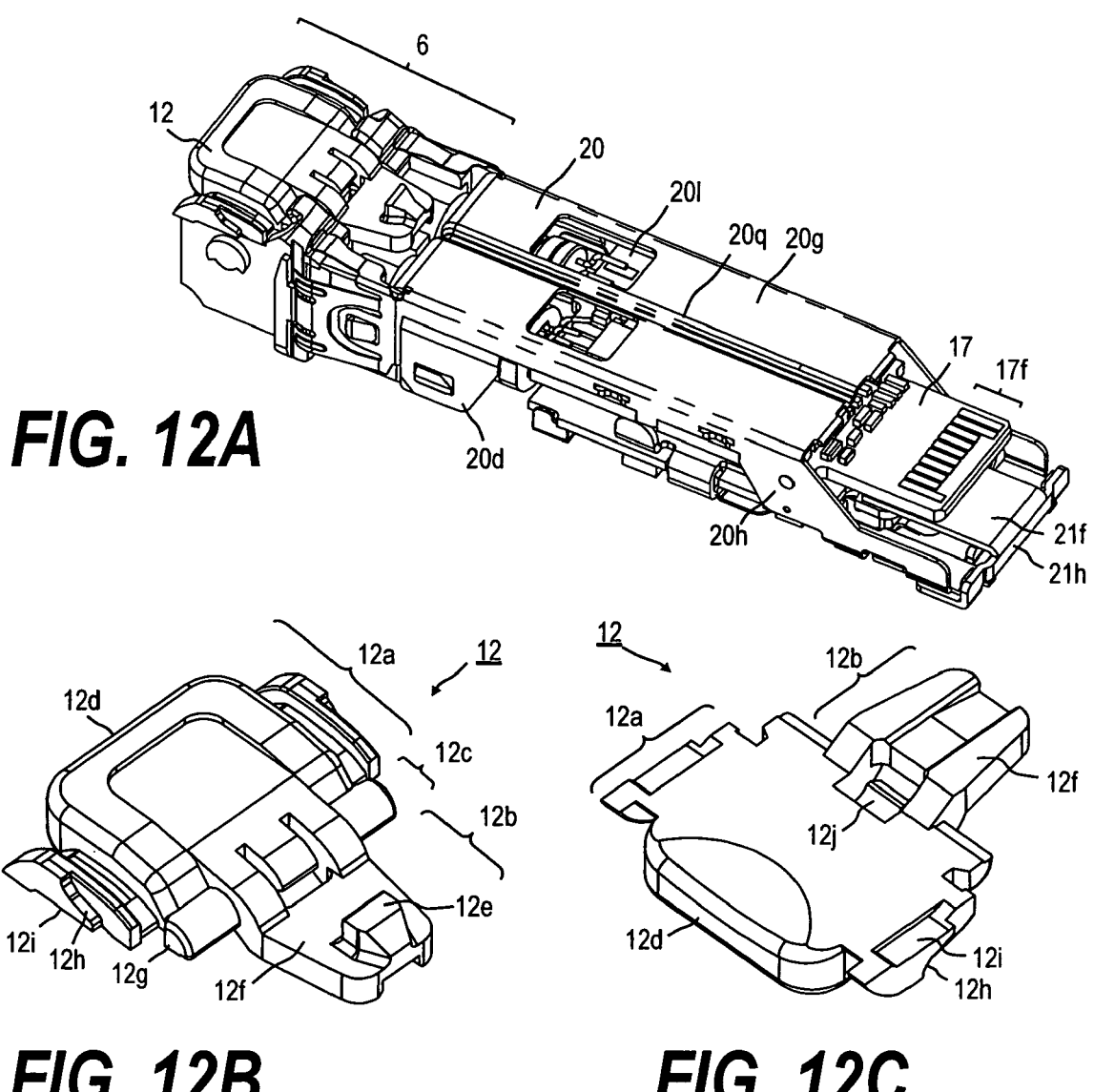
FIG. 12A
FIG. 12B
FIG. 12C
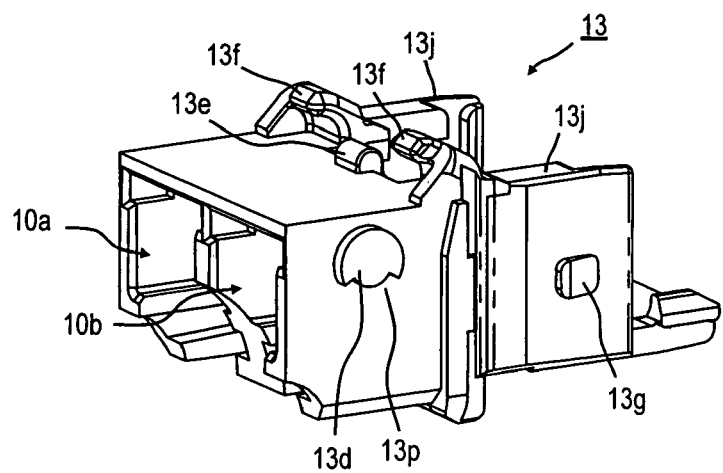
FIG. 12D

HEAT DISSIPATING MECHANISM OF A PLUGGABLE OPTICAL TRANSCEIVER

CROSS REFERENCE TO RELATED APPLICATIONS

The present application claims the benefit of the provisional application Ser. No. 60/615,587, filed Oct. 5, 2004; the provisional application Ser. No. 60/620,325, filed Oct. 21, 2004; the provisional application Ser. No. 60/632,937, filed Dec. 6, 2004; and the provisional application Ser. No. 60/652,846, filed Feb. 15, 2005.

BACKGROUND OF THE INVENTION

1. Field of the Invention

The present invention relates to a structure of a pluggable optical transceiver, and a method for manufacturing the same.

2. Related Prior Art

The pluggable transceiver 1 (hereinafter denoted as transceiver) shown in FIG. 1A is used by being inserted into the cage 2 provided on the circuit board of the host system. The transceiver 1 inserted into the cage 2 is shown in FIG. 1B. On the bottom of the cage 2 are formed stud pins 2c, and the cage 2 is installed on the circuit board of the host system by soldering these stud pins 2c to the circuit board so as to expose the opened end 2a from the face panel of the host system. In the inner end of the cage 2 is provided an electrical connector 2b such that each electrode of the connector 2b is in contact to, or soldered to the wiring pattern on the circuit board. By inserting the transceiver 1 into this cage 2, the electrical plug configured in the rear end of the transceiver 1, mates with this connector 2b within the cage to enable the transceiver 1 to communicate with the host system. In FIG. 1B, the host system, the circuit board and the face panel thereof, are omitted. Moreover, to configure the electrode of the plug makes the transceiver 1 so-called host-pluggable, by which the transceiver 1 is able to insert into/remove from the cage 2 as the host system is powered on.

The cage 2, as shown in FIG. 1B, is a metal box with one end 2a being opened. Although a tip of the tab plate protrudes from the cover 23 of the transceiver 1, when the transceiver 1 is set within the cage 2, this tab plate 14 is also set within the cage 2 as the tip thereof coming in contact to the inside of the cage 2. Moreover, a plurality of fins 2d extends outward in the front portion thereof to surround the opened end 2a. When the cage 2 is installed on the circuit board of the host system, these fins 2a come in electrically contact to the face panel to shield the transceiver 1 and the host system.

Some multi-source agreements (MSA) rule the outer dimension and the electrical specification for such pluggable transceiver. The normal operation can be ensured as long as the transceiver follows the agreements, even when such transceiver is provided from the extraordinary manufacturer. Further, since the agreement rules the outer dimension, the insertion/extraction of the transceiver is also ensured.

However, the cage itself is made of a thin metal plate to deform in ease by an extra force, even by the insertion/extraction of the transceiver to the cage. The tab plate is necessary to come in reliable in contact to such deformed cage. The tab plate is provided to secure the EMI (Electro-Magnetic Interference) shield function for the transceiver 1. Recently, the operational speed, i.e., the clock speed of the transceiver reaches and exceeds 1 GHz. In such high speed operation, the high frequency signal is firmly prevented from leaking from the equipment. The tab plate is necessary to come in contact to the physically deformed cage 2.

Another subject under such high operational speed is that, the active devices, such as ICs and transistors, installed within the transceiver becomes necessary to be provided with large current to operate in a high frequency band, which results in the further heat being generated in the devices and the request to provide a further effective mechanism for the heat dissipation. However, the transceiver is unable to touch the case thereof in tight to the cage because the pluggable transceiver is inherently assumed to be inserted into/extracted from the cage 2. Tightly and firmly touching to the cage disturbs the smooth insertion/extraction of the transceiver.

Further, the transceiver comprises of three parts, namely, subassemblies to covert an optical signal to an electrical signal, or an electrical signal to an optical signal, a body portion installing the electronic circuit and an optical receptacle, and a mechanism to engage the transceiver with the cage. The U.S. Pat. No. 6,349,918 has disclosed the engaging mechanism using a bail and an actuator. Rotating the bail in front of the optical receptacle, one end of the bail pushes up the actuator, accordingly, the other end of the actuator is pressed down to disengage with the cage because the actuator moves in the seesaw motion. The other U.S. patent published as 2003/0142917A has also disclosed a similar mechanism.

Recently, one application has been proposed that, a plurality of transceivers is arranged in dense to configure a hub system for the optical communication. For example, to arrange the transceiver, the cross section of which is about 1 centimeter square, by 16 pieces in horizontal and two to four in vertical forms the hub system providing 32 to 64 optical channels. In such system, when the target transceiver is to be removed from the cage as the other cages surrounding the target transceiver are set with transceivers each providing an optical cable, the bail of the target transceiver is hard to rotate because the neighbor transceivers and their optical cables prevent from touching thereto, which prohibit the target transceiver from being extracted from the cage.

Therefore, the present invention is to provide a new structure of the optical pluggable transceiver based on the MSA and a method for manufacturing the same. The transceiver according to the present invention, not only satisfies the MSA standard, but also ensures the reliable shielding by stably touching to the cage, provides the effective heat dissipation mechanism from the devices to the outside thereof, and provides a disengaging mechanism with the cage even a plurality of transceivers with the optical cable is densely arranged.

SUMMARY OF THE INVENTION

One aspect of the present invention relates to an optical transceiver configured with a pluggable function that is capable of inserting into or extracting from a cage. The cage is installed on a host system so as to expose one end portion thereof from the face panel of the host system to receive an optical connector. The cage also provides an electrical connector in the other end thereof. The electrical connector is mated with the optical transceiver as the host system is powered on.

The optical transceiver according to the present invention comprises an optically assembly unit and a body unit. The optical assembly unit includes an optical receptacle to receive the optical connector, and the optical subassembly with a semiconductor device therein to couple in optical to an optical fiber secured in the optical connector. On the other hand, the body unit includes a substrate, a metal base, a metal cover and a heat conducting plate made of metal, may be made of copper based alloy. The substrate provides an electrical plug in one end thereof to mate with the electrical connector within the cage and mounts an electrical circuit electrically connected to the electrical plug and the device within the optical subassembly. The heat conducting plate is in contact to the electronic circuit. The base includes first and second portions. The first portion mounts the substrate and the second portion is fitted to the heat conducting plate. The cover puts the optical subassembly, the substrate, the base and the heat conducting plate therein. The transceiver of the present inventions arranges the optical subassembly, the substrate, the base and the heat conducting plate in longitudinal, and the heat conducting plate is in directly contact to the cage at a rear end of the transceiver to conduct heat generated in the electronic circuit to the cage.

Since the pluggable transceiver is to be inserted into or extracted from the cage, a heat dissipating mechanism such as thermal fins in the outer surface of the transceiver can not provide because such mechanism becomes barriers to insert/extract the transceiver. However, the present transceiver provides the heat conducting plate to conduct heat from the circuit installed in the middle of the transceiver to the rear end thereof and to dissipate thus conducted heat to the cage, accordingly, the heat dissipation mechanism of the invention does not become the barrier for the insertion or the extraction of the transceiver.

The heat conducting plate may be configured with a zigzag shape or a U-shape in the cross section thereof. That is, the heat conducting plate may include first to third portions. The first portion is in contact to the electronic circuit in the middle of the transceiver. The second portion fits the base thereto and the third portion is in contact to the cage. In the zigzag shaped heat conducting plate, the heat transferred to the first portion is conducted in the second portion to the third portion. While, in the U-shaped heat conducting plate, the heat transferred to first portion is conducted within the first portion to the third portion. In either case, the heat transferred to the first portion may be effectively to the third portion and is dissipated to the cage.

The optical transceiver of the present invention may further provide a thermal sheet between the electronic circuit and the first portion of the heat conducting plate to enhance the heat conduction. The thermal sheet may be made of a resin material. Another thermal sheet may be put between the optical subassembly and the cover. The optical subassembly includes a stem for mounting the semiconductor device thereon, and the stem is exposed between the optical receptacle and the substrate. To put the thermal in this exposed region to be in contact to the stem and the cover may enhance the heat dissipating effect from the stem to the cover. The heat thus conducted to the cover may radiate to the cage and may be conductor to the rear end of the transceiver and may be conducted to the cage. The optical subassembly may install a bracket thermally connected to the substrate. The thermal sheet may be also in contact to the bracket to conduct heat from the stem to the cover.

The optical transceiver may further provide still another thermal sheet between the stem and the base to enhance the heat dissipation from the stem. The heat conducted from the stem to the base is conducted to the cover and is radiated to the cage, or conducted to the second portion of the heat conducting plate, conducted to the rear end of the transceiver and is dissipated to the cage there.

The cover may provide structures with a paired slit and a portion between these slit to be bent inward. This bent portion may be in contact to the heat conducting plate in the second portion thereof to enhance the heat dissipating effect from the heat conducting plate to the cover. The heat conducting plate may provide a support post with an abutting surface in the tip thereof. The bent portion of the cover may abut against this abutting surface not only to press the heat conducting plate downward to make the contact to the electronic circuit in secure but also to enhance the heat dissipating effect from the heat conducting plate to the cover.

The cover may further provide a tab in a side where the optical assembly unit is attached. The tab comes indirectly contact to the cage when the transceiver is set within the cage. Therefore, the heat conducted to the cover is effectively dissipated to the cover not only in the rear end thereof but also in the front side of the transceiver.

BRIEF DESCRIPTION OF DRAWINGS

FIG. 9A is a downward view of the heat conducting plate, while

FIG. 12A illustrates the transceiver assembled with the actuator, FIG. 12B is an upward view, while FIG. 12C is a downward view of the actuator, respectively, and FIG. 12D illustrates a portion of the receptacle member to be engaged with the actuator;

DETAILED DESCRIPTION OF PREFERRED EMBODIMENTS

Figure 2:
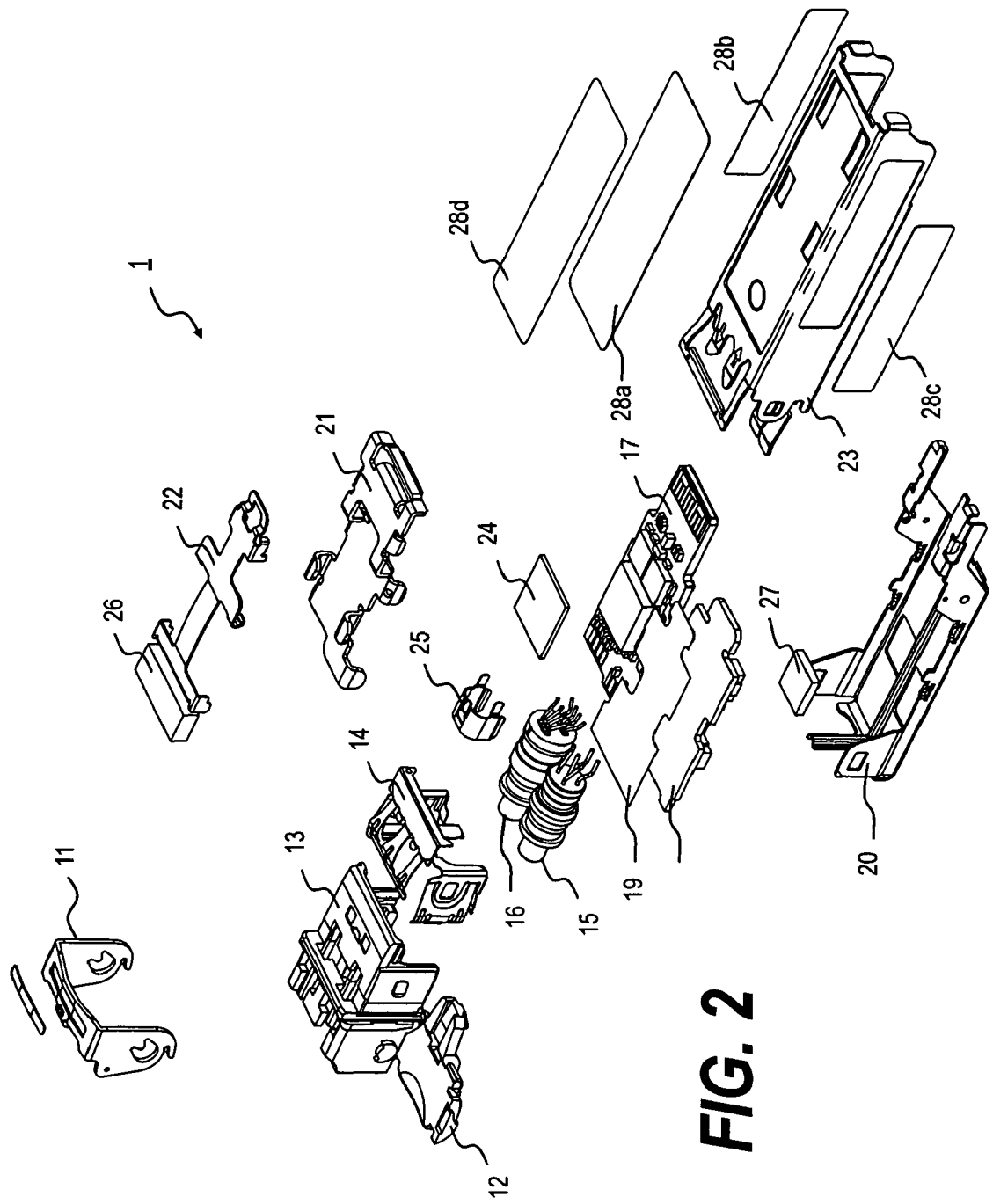
FIG. 2 is an exploded view of the transceiver.

Next, a configuration of an optical transceiver and a method for assembling the transceiver according to the present invention will be described as referring to accompanying drawings. FIG. 2 is an exploded view of the optical transceiver of the present invention. The pluggable transceiver 1 shown in FIG. 2 comprises a body unit and an optical subassembly unit. The body unit includes a primary substrate 17, a supplementary substrate 18, a supporting mechanism of these substrates, and a cover 23. The supporting mechanism comprises a base 20, a heat-conducting plate 21 and a supporting plate 22. The optical sub-assembly unit includes transmitting and receiving optical subassemblies, 15 and 16, respectively, and members, 11 to 14, to show the optical coupling function as described below.

Optical Sub-Assembly Unit

The optical sub-assembly unit includes, in addition to two optical subassemblies (OSAs), 15 and 16, a receptacle member 13 made of resin, an actuator 12, a bail 11 and a tab plate 14. The bail 11 may be made of resin or metal. The bail 11 and the actuator 12 perform a mechanism to disengage this transceiver 1 with the cage 2. As described later in this specification, to rotate the bail 11, with a projection formed in sides of the receptacle member 13 as the center of the rotation, moves the front end of the actuator 12 downward. The actuator 12 is fixed to the receptacle member 13 in the center thereof. Accordingly, due to the seesaw motion as this fixed point being the center of the rotation, the rear end of the actuator 12 moves upward, which pulls the projection formed in the tip of the rear end of the actuator 12 inward to release the engagement of the projection with the opening of the cage 2.

As for the releasing mechanism by the combination of the bail 11 and the actuator 12, it is known that the actuator 12 is slid backward as the rotation of the bail 11. In this mechanism, the projection to be engaged with the cage is fixedly formed in the bottom of the receptacle member 13 not the tip of the actuator 12. Inserting the transceiver 1 into the cage 2, the projection in the bottom thereof engages with the opening of the cage as deforming the cage 2. When releasing the transceiver 1 from the cage 2, the rear end of the actuator 12 spreads the cage 2 outward as sliding the actuator in forward, thus disengaging the projection with the opening of the cage 2.

In both mechanisms, the rotation of the bail 11 releases the engagement of the transceiver 1 with the cage 2. In other words, it is not restricted to those mechanisms mentioned above as long as the transceiver provides a mechanism to release from the cage and the mechanism is originally brought by the rotation of the bail 11.

An assembly of the receptacle member 13, the tab plate 14 and subassemblies, the TOSA 15 (Transmitting Optical Sub-Assembly) and the ROSA 16 (Receiving Optical Sub-Assembly), installed in the receptacle member 13, is called as an OSA unit 6 as a whole. From FIG. 3A to FIG. 4B show the assembly of the OSA unit 6.

The OSAs, 15 and 16, includes the TOSA 15 and the ROSA 16 when the transceiver 1 has a function of the full-duplex communication standard. Both OSAs, 15 and 16, has a coaxial package. The ROSA 16 installs a semiconductor light-receiving device, which is typically an avalanche photodiode, APD, or a PIN-PD, collectively called as the PD, and a preamplifier for amplifying an electrical signal generated by the PD. On the other hand, the TOSA 15 installs a laser diode (LD) and, in addition to the LD, a PD for monitoring the optical output from the LD. A thermo-electric device, called as a Peltier device, may be also installed within the TOSA 15. Moreover, when the driving frequency of the LD exceeds 10 GHz, the driver for the LD maybe also installed within the package. The signals and power lines from the OSA to the board, or from the board to the OSA, are transferred through lead pins, 15b and 16b, provided in the rear end of the OSA, which is so-called the stem, 15a and 16a. A flexible printed circuit (FPC) board may be used in place of the lead pins, 15b and 16b.

Figure 3A:
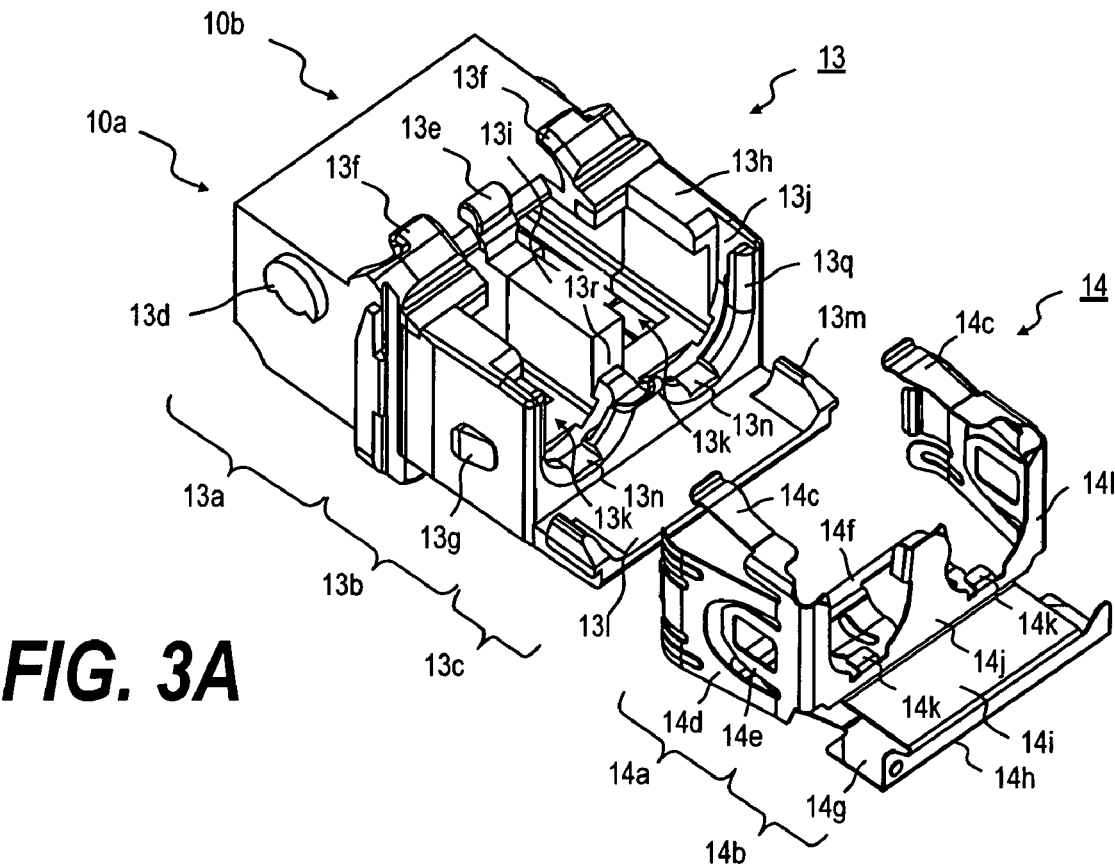
FIG. 3A illustrates the receptacle member and the tab plate to be attached with the receptacle member.

The receptacle member 13, which is made of resin, includes first to third portions, 13a to 13c, as shown in FIG. 3A. The first portion 13a, positioned in the front end of the receptacle member 13, provides two cavity, 10a and 10b, into which the optical connector is to be inserted. These cavities, accordingly, called as the optical receptacle. The outer side of the first portion 13a forms a projection 13d that becomes the axis of the rotation of the bail 11. The bottom of the first portion 13a forms a projection 13e in the center and two beaked hooks 13f in the both sides of the projection 13e arranged along the boundary to the second portion 13b, as shown in FIG. 3A that look downs the bottom of the receptacle member 13. The center projection 13e mates with the hollow formed in the center of the actuator 12 and two beaked hooks receives the axis 12g, which enables the actuator 12 to operate in the seesaw motion around the axis 12g.

The second portion 13b includes side walls and a center partition 13i, which forms to two cavities 13k to receive the TOSA 15 and the ROSA 16, respectively. The bottom of the cavity 13k is opened to set the OSAs therein. U-shaped cuttings are formed in the boundary wall 13q to the third portion 13c. The U-shaped cutting provides a groove 13j along the exposed section, which receives the flange, 15c and 16c, of the OSAs to position respective OSAs in the cavity 13k. Thus setting the OSA within in the cavity 13k, sleeves, 15d and 16d, formed in the head of the OSA, protrude into the optical receptacles, 10a and 10b, of the first portion 13a. Accordingly, semiconductor optical devices such as the LD or the PD installed on the OSAs may optically couple with the optical fiber in the optical receptacles, 10a and 10b. The optical fiber provides, in the tip thereof, the optical connector to be inserted into the receptacle. Since the physical dimensions of the optical receptacles, 10a and 10b, and the position of the sleeves, 15d and 16d, with respect to the optical receptacles, 10a and 10b, are precisely ruled, the position of the OSAs, 15 and 16, in particular the sleeve thereof, must be fixed with respect to the receptacle member 13.

In a center of the side wall 13h forms a projection 13g. As described later in this specification, to mate this projection 13g with an opening in the tab plate 14 and an opening in the cover 23 assembles the tab plate 14 and the cover 23 with the receptacle member 13. The projection 13d has a gentle slope in the side where the tab plate 14 is inserted to mate the tab plate 14 in smooth, while, the other side thereof has a precipitous slope in order to prevent the tab plate 14 and the cover 23 engaged with the projection 13g from releasing in ease.

The third portion 13c includes an upper wall 13l continued from the upper wall in the second portion 13b and two projections formed in both ends thereof to mate with the base 20.

The tab plate 14 includes first and second portions, 14a and 14b, respectively. The first portion 14a forms a plurality of fins, 14c, 14d and 14f, which surround the receptacle member 13 and extend outwardly. These fins, 14c, 14d and 14f, as described later, are to come in contact to the inside of the cage 2 to function the electromagnetic interference (EMI) shield. The fin 14*f* in both sides and another fin 14*f* in the bottom have a configuration that the center portion 14*m* thereof protrudes to come in contact to the inside of the cage 2 in reliable. The tip of the fins, 14*c*, 14*d* and 14*f*, configures in wavy and the bottom portion of this wave fits within the groove formed between the first 13*a* and second 13*b* portion of the receptacle member 13. The fin 14*d* in both sides has an opening 14*e* within which a latch tab 14*e* is formed. A center hole of this latch tab 14*e* engages with the projection 13*g* of the receptacle member 13 to assemble the tab plate 14 with the member 13.

The second portion 14*b* of the tab plate is folded twice. That is, to bend a surface 14*g* extending form the fin 14*f* in almost right angle forms a surface 14*h*, and to bend again in almost a right angle forms another surface 14*i*. The surfaces, 14*g* and 14*i*, put the upper wall 13*l* of the receptacle member 13 therebetween. Thus, the tab plate 14 is securely assembled with the receptacle member 13.

The second portion 14*b*, bent in almost right angle to a direction opposite to the fin 14*f*, forms a surface 14*l*. This surface 14*l* provides two cuttings tracing the U-shaped cutting of the receptacle member 13. In the bottom of this cutting provides a latch tab 14*k* that fits to the groove 13*n* formed in the bottom of the U-shaped cutting of the receptacle member 13 to position the tab plate 14 with respect to the receptacle member 13. A center of this surface 14*l*, between two U-shaped cuttings, forms a spacer 14*j* by bending the tab plate 14. The width of the U-shaped cutting of the surface 14*l* is set slightly smaller than the diameter of the OSAs. Accordingly, the OSAs once set within the cutting of the tab plate 14, is hard to disassemble. A portion in the receptacle member 13 facing this spacer 14*j*, namely, between the end of the center partition 13*i* and the spacer 14*j* forms a hole 13*r*, into which the center post 20*f* of the base 20 is inserted in the assembly of the base 20 with the receptacle member 13. The tab plate 14 is made from a metal plate with a thickness of about 0.15 mm and may be made of stainless steel only by cutting, bending and tapping without welding, gluing, or screwing, which may not only reduce the cost of the component but also decrease the const of the manufacturing process.

Figure 3B:
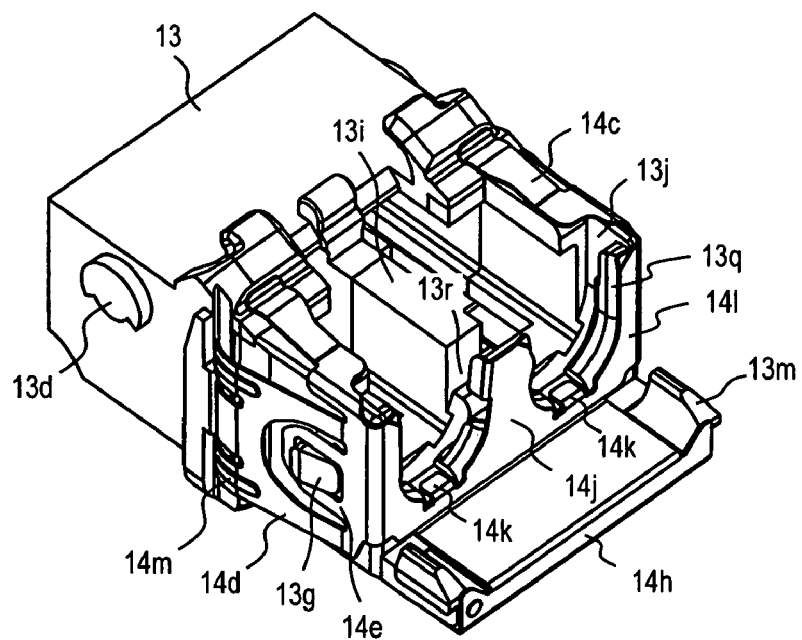
FIG. 3B illustrates the receptacle member assembled with the tab plate.
Figure 4A:
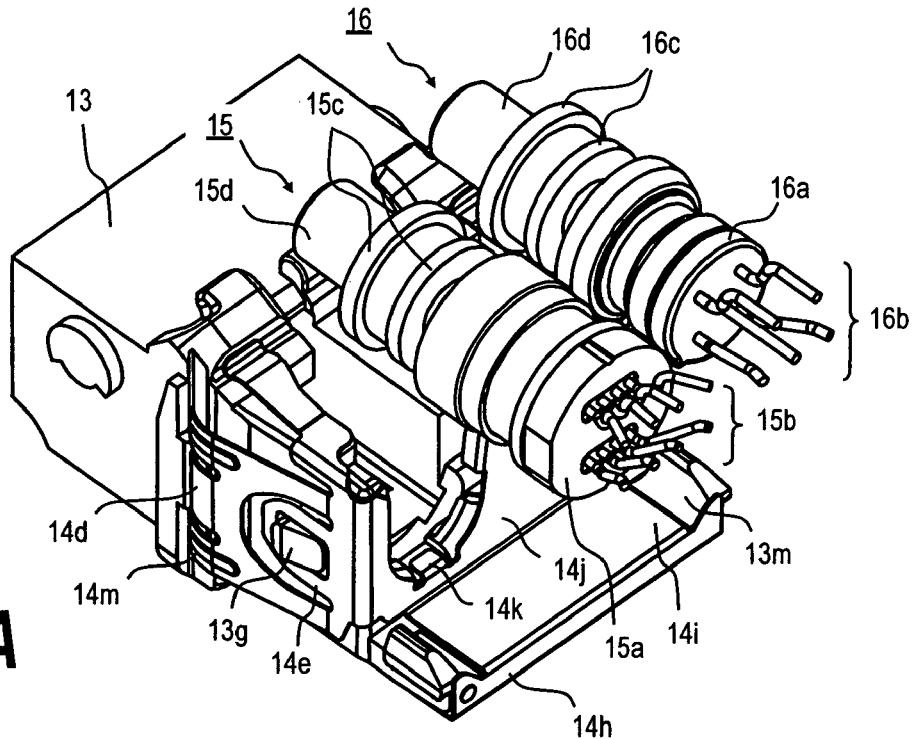
FIG. 4A illustrates the assembly of the receptacle member and the tab plate and the OSAs to be installed on the assembly.
Figure 4B:
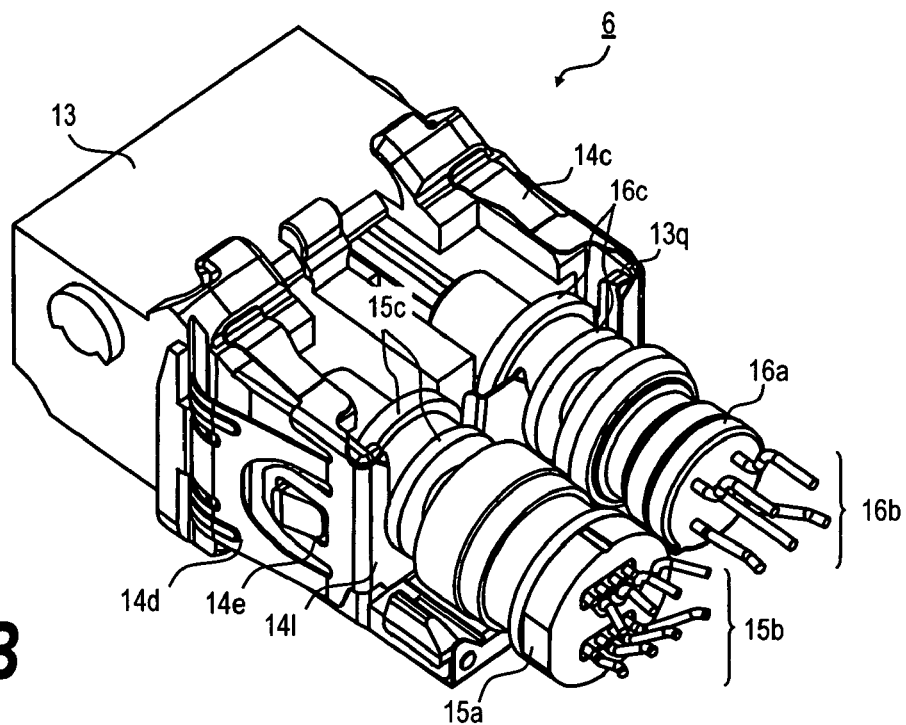
FIG. 4B illustrates the OSAs installed on the assembly of the receptacle member with the tab plate to form the OSA unit.

FIG. 3B shows the assembly of the receptacle member 13 with the tab plate 14, FIG. 4A shows a step for setting OSAs into this assembly of the receptacle member 13 with the tab plate 14, and FIG. 4B shows that the OSAs, 15 and 16, are set within the cavities 13*k* of the receptacle member 13 with the flanges, 15*c* and 16*c*, aligned within the U-shaped cutting. Setting the OSAs, 15 and 16 within the receptacle 13 together with the tab plate 14, a respective pairs of the flanges, 15*d* and 16*d*, of the OSAs put the wall 13*q* behind the groove 13*j* forming the U-shaped cutting therebetween together with the surface 14*l* of the tab plate 14. Using the metal sleeve, 15*d* and 16*d*, and providing the latch 14*k* within the U-shaped cutting of the tab plate 14, the electrical conduction from the tab plate 14 to the metal sleeves, 15*d* and 16*d*, may be ensured. Since the tab plate 14 is connected to the cage 2 by the fins thereof, 14*c*, 14*d*, and 14*f*, the present transceiver 1 may firmly and securely ground the metal sleeves, 15*d* and 16*d*.

Body Unit

Next, the body unit of the transceiver 1 will be described. The body unit includes the base 20, the cover 23, the primary substrate 17, a supplementary substrate 18, the heat-conduction plate 21, and the supporting plate 22.

Figure 5A:
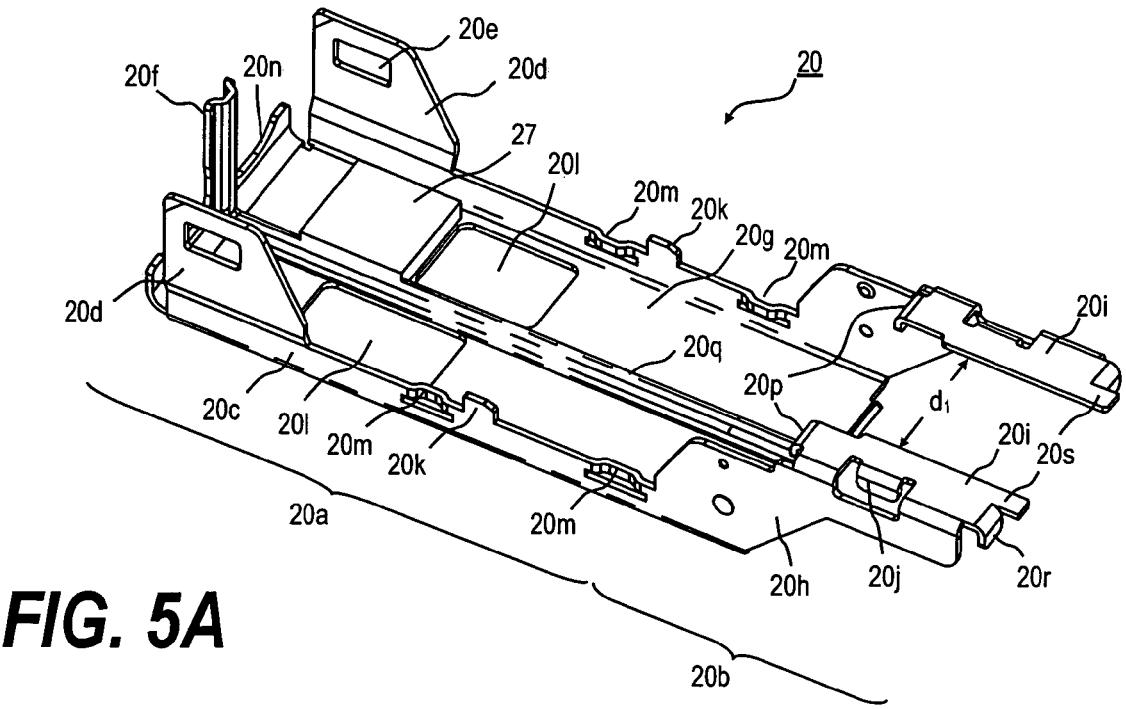
FIG. 5A shows the configuration of the base.
Figure 5B:
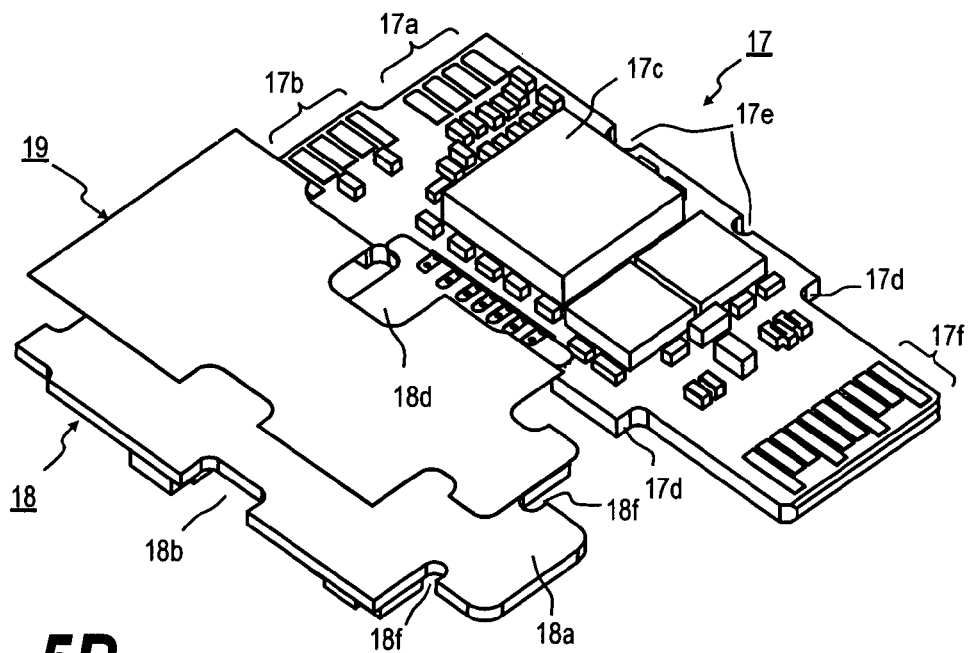
FIG. 5B illustrates the primary substrate, the supplementary substrate, and the insulating film inserted between the primary and supplementary substrates.

FIGS. 5A and 5B show the primary and supplementary substrates, 17 and 18, and the base 20. On the primary substrate 17 is installed with an electronic circuit including an integrated circuit (IC) 17*c*. A laser driver for driving the LD, a signal processor for extracting a clock component and a data component from an amplified signal sent from the ROSA 16, or, when the APD is used as a light-receiving circuit, a bias controller for generating and adjusting the reverse bias voltage provided to the APD, are known as the electronic circuit installed on the substrates, 17 and 18. Moreover, when the thermo-electric controller such as the Peltier device is installed within the TOSA 15, the Peltier driver is also installed within the substrates, 17 and 18. When the size of the circuit above mentioned becomes large, or an additional circuit such as a processor for controlling in inclusive those circuits and a memory are necessary to be installed within the transceiver 1, the supplementary substrate 18 may install circuits not processing a high speed signal, typically the controlling circuit for the APD and the Peltier driver.

The primary substrate 17 connects to the supplementary substrate 18 with a FPC board 18*d*. This FPC board 18*d* is soldered to the primary substrate 17 extending from the side of the supplementary substrate 18. As described later, the supplementary substrate 18 is overlaid on the primary substrate 17 by bending this FPC board 18*d*. The insulating film 19 is inserted between the supplementary substrate 18 and the heat conducting plate 21 to prevent the back side of the supplementary substrate 18 from electrically shorting to the heat-conducting plate 21.

On the rear end of the primary substrate 17 is provided an electrical plug 17*f*. This plug 17*f* may mate with the electrical connector in the inner end of the cage 2, which enables electrical communication of the electrical circuit installed within the transceiver 1 with that of the host system. To configure the electrode of this plug 17*f* with the predetermined pattern may realize the host-pluggable function that the transceiver 1 may insert into or remove from the cage as the host system is powered on.

The electrical connection between the circuit installed on the primary substrate 17 with the OSAs, 15 and 16, are carried out by lead pins, 15*b* and 16*b*. The primary substrate 17 provides electrodes, 17*a* and 17*b*, each electrically connected to the lead pins, 15*b* and 16*b*, of the OSAs. The FPC board may serve as the lead pins. When the operational speed of the transceiver 1 enters the zone over 1 GHz, it is preferable to connect the OSAs, 15 and 16, to the primary substrate 17 with a means that secures the impedance-matching condition. Even the FPC board connects the OSAs, 15 and 16, to the primary substrate 17; the interconnection formed on the FPC board may be a micro-strip line or a co-planar line with the impedance-matched configuration. Moreover, when the connection is carried out under an impedance-mismatched condition, it is preferable to make the connection means as short as possible to escape from the deterioration in the signal transferred from/to the OSAs, 15 and 16 by the mismatching.

The primary substrate 17 forms a plurality of notches 17*e*, in the side thereof. As described later, to fit this notch 17*e* to the projection 20*k* formed in the base 20 and to abut the step 17*d* formed in the rear side of the substrate 17 against the side wall of the coupling portion 20*h* automatically determines the longitudinal position of the substrate 17 within the transceiver 1.

The base 20 covers the bottom side of the OSA and mounts the primary substrate 17 thereon. The base 20 is also made from a metal plate, such as iron or stainless steel, by cutting, bending and tapping without gluing, welding and screwing, which reduces the cost of the transceiver 1. That is, the base 20 includes a first portion 20*a* and a second portion 20*b*. The first portion 20*a* provides a space opened upward to install the primary substrate 17 thereon. The second portion 20*b*, formed in the rear of the first portion 20*a*, provides a space opened downward to install the heat-conducting plate 21.

The first portion 20a includes a bottom 20g, a pair of sides 20c extending from the bottom 20g, a support 20d that constitutes a portion of the sides 20c, and a front wall 20n extending from the bottom 20g at the front edge. On the center of the bottom 20g is formed with a rib 20q extending along the longitudinal direction of the transceiver 1 and depressed inward. The front end of the bottom 20g forms a center post 20f that is, as aforementioned, inserted into the hole 13r of the receptacle member 13 to assemble the base 20 with the receptacle member 13. The rib 20q not only positions the cover 23 when the base 20 is put into the cover 23 but also mechanically strengthens the base 20.

The bottom 20g further forms two openings 20l, through which the soldering between the lead pins, 15b and 16b, of the OSAs to the primary substrate 17 may be carried out. The substrate 17 is a double-sided wiring substrate to enhance the flexibility of the interconnection. Although FIG. 5B illustrates electrodes, 17a and 17b, only on the front surface of the substrate 17, electrodes similar to that of the front side are formed in the back side, and the lead pins, 15b and 16b, sandwiches the substrate 17 to connect to the electrodes in both sides thereof. Since to set the substrate 17 to the base 20 hides the electrodes in the back side, the openings 20l exposes the electrodes and the lead pins in the back side to enable the soldering thereto.

The side for the TOSA in the bottom 20g places the thermal sheet 27 thereon in advance to the assembly. The thermal sheet 27 comes in contact to the stem 15a of the TOSA 15 to dissipate heat generated within the TOSA 15 to the cover 23 via the base 20. Although the ROSA 16 generates heat greater than that from the TOSA 15 because the ROSA installs the pre-amplifier in addition to the PD, such circuit generally shows the dull temperature dependence compared to that of the LD. The LD shows the strong temperature dependence in its light-emitting characteristic. Therefore, the thermal sheet 27 is provided only for the TOSA 15. When the preamplifier installed within the ROSA 16 generates large heat, for example, in the operational speed greater than 10 GHz, it is preferable to provide the thermal sheet for the ROSA 16.

The side 20c forms a projection 20k in a center thereof and two steps 20m putting the projection 20k therebetween. The projection 20k, as previously described, fits into the notch 17e formed in the side of the substrate 17 to position the substrate 17. The step 20m stabilizes the substrate 17 by overlaying the substrate 17 thereon. Without the step 20m, the substrate 17 comes in contact to the base 20 only by the section of the side 20c, which may be unstable for the substrate 17. The step 20m, which is formed by bending a portion of the side 20c inward, secures the stability of the substrate 17 with respect to the base 20.

The front portion of the side 20c forms the support 20d continuously extending upward. The support 20d provides the opening 20e in a center thereof that engages with the projection 13m of the receptacle member 13 to assemble the base 20 with the receptacle member 13. The front wall 20n configures a gentle U-shape that follows the outer shape of the OSAs, 15 and 16.

The rear portion of the side 20c forms the coupling portion 20h by extending thereof upward. The second portion 20b includes a coupling surface 20i by bending this coupling portion 20h inward. The coupling surface 20i includes a pair of tabs 20j by bending a portion thereof downward, to be put between the legs 21k of the heat-conducting plate 21. The rear end of the coupling surface 20i is partially bent downward to form the surface 20r and to protrude the rest portion 20s backward. As described later, the gap $d_1$ between the coupling surface 20i is set slightly narrower than the width of the spacer tab 21l. Assembling the heat conducting plate 21 with the base 20, the coupling surface 20i of the base 20 is to be spread outward by the spacer tab 21l, while the legs 21k of the heat conducting plate 21 presses the tabs 20j inward, which fits the heat conducting plate 21 to the base 20. The front and rear ends of the coupling surface 20i is bent downward to form surfaces, 20p and 20r, to abut against the heat-conducting plate 21, which perform the similar function to that between the tab 20j and the leg 21k. The second portion 21b of the heat conducting plate 21 assembles with the base 20 by fitting the surfaces, 20p and 20r, in the base 20 between the surfaces, 21i and 21s, and by fitting the tabs 20j between the legs 21k.

Thus, the base 20 of the present invention is made from a metal plate with cutting, bending, and tapping without welding, gluing, screwing or casting. The rib 20q in the bottom secures the mechanical strength of the base 20. Moreover, the assembly with the substrate 17, the receptacle member 13 and the heat conducting plate 21 may be carried out only by fitting, which not only reduces the cost of the material but also simplifies the assembling process.

Next, the heat-dissipating mechanism of the transceiver 1 will be described. It is inevitable to consume greater power by the devices used in the transceiver 1 as the operational speed thereof increases. Therefore, the heat-dissipating mechanism for these devices becomes necessary. However, since the pluggable transceiver 1 is used by inserting into/extracting from the cage 2, it is impossible to provide a mechanism such as the heat-dissipating fin, although quite popular in the electronic equipment, in the outer surface of the transceiver. These fins prevent the transceiver 1 from smoothly inserting into/extracting from the cage 2. Due to the same reason, it is prohibited that the outside of the transceiver 1 comes in contact to the inside of the cage 2.

Figure 9A:
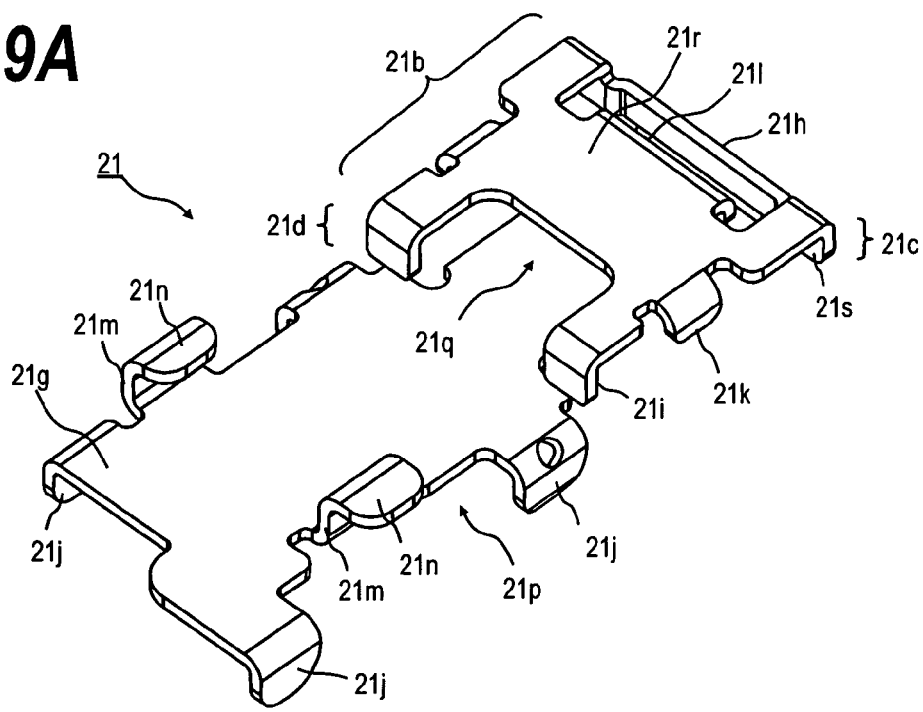
Figure 9B:
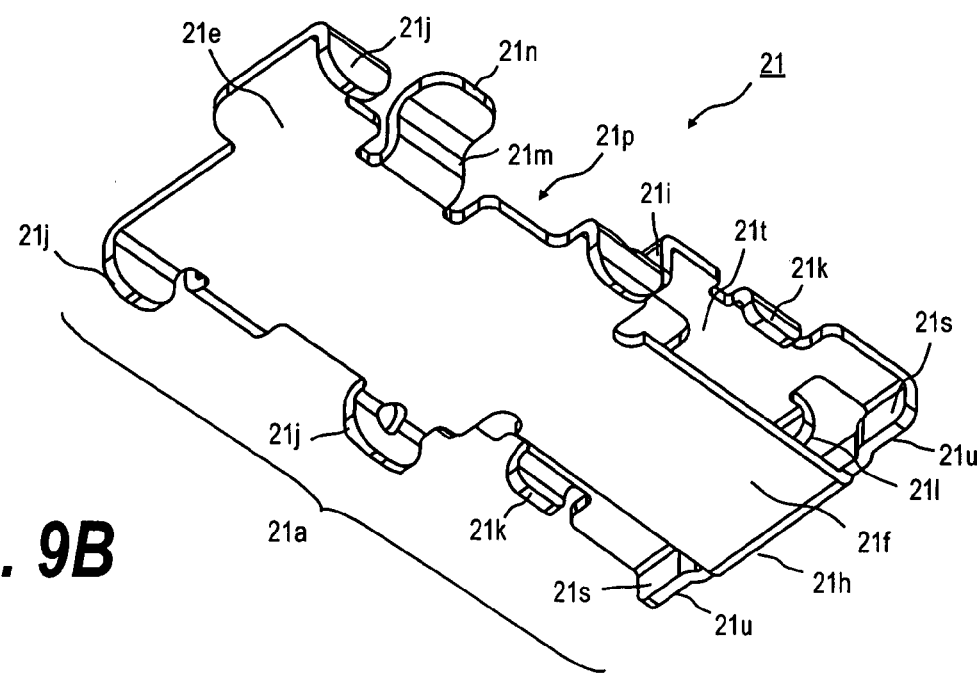
FIG. 9B is an upward view thereof.

The heat conducting plate 21 primarily performs the heat-dissipating mechanism of the present transceiver 1. From FIG. 7A to FIG. 8B illustrate the heat-conducting plate 21 to be assembled with the base 17, while FIGS. 9A and 9B illustrate the configuration of the heat-conducting plate 21 from the top (FIG. 9A) and from the bottom (FIG. 9B). The heat-conducting plate 21 is also made from a metal plate only by cutting and bending. The plate 21 includes first to fourth portions, 21a to 21d. The first portion 21a configures a substantially rectangle surface 21g, connected to the third portion 21c by bending a rear end thereof upward. This third portion 21c connects the second portion 21b by bending the other edge. The second portion 21b becomes substantially in parallel to the first portion 21a and covers a portion of the first portion 21a. The fourth portion 21d is bent by the other end of the second portion 21b downward to form a surface 21i.

The first portion 21a includes a surface 21g with a substantially rectangular, back surfaces, 21e and 21f. A plurality of legs 21j extends from a pair of sides thereof downward by bending, tips of which come in contact to the primary substrate 17 to press down the substrate 17. A pair of support posts 21m extends upward from the same sides, from which the legs 21j extends downward. The tips of the support are bent to form the abutting surface 21n. The back surface 21e of the first portion 21a comes in contact to the whole upper surface of the IC 17c installed on the substrate 17 to conduct heat from the IC 17c to the heat-conducting plate 21. The heat conducted to the plate 21 is transferred in the first portion 21a rearward through other surface 21f of the first portion 21a to the third portion 21c. It is preferable to put the thermal sheet 24 between the IC 17c and the back surface 21e of the plate 21 to enhance the efficiency of the heat conduction. The length of the leg 21j is determined to take the thickness of this thermal sheet 24 and that of the IC 17c in to consideration. It is preferable to set the length of the leg 21*j* slightly smaller than the total thickness of the IC 17*c* and the sheet 24. To press this abutting surface 21*n* downward by put the cover 23 ensures the thermal contact between the plate 21 and the sheet 24 and between the sheet 24 and the IC 17*c*.

The third portion 21*c* extrudes rearward to come the end surface 21*h* in contact to the inner end of the cage 2, which enhances the heat transferred to the plate 21 from the IC 17*c* to dissipate to the cage 2. Even the end surface 21*h* comes in contact to the cage 2, the insertion into/extraction from the cage 2 of the transceiver 1 is not affected at all. Only the rear end surface 21*h* of the transceiver 1 provides the effective heat-dissipation path to the cage 2. The present transceiver 1 enables to dissipate heat generated from the IC 17*c* installed in the middle thereof to the cage 2 by the heat conducting plate 21. The performance of the heat conduction of the plate 21 depends on the cross section thereof. Since the width of the plate 21 is inherently restricted by the width of the transceiver 1, the performance of the heat dissipation primarily depends on the thickness of the plate 21. The present transceiver 1 uses copper based alloy with a thickness of 0.5 mm, which shows a quite effective heat-dissipating function.

The second portion 21*b* overlaps a rear half of the surface 21*g* of the first portion 21*a*. The second portion 21*b* also configures a substantially rectangular, an upper surface 21*r* thereof coming in contact with the inside of the cover 23 to assist the heat-dissipation from the plate 21 to the cover 23. Both sides of the second portion 21*b* have tabs 21*k* by bending downward to put the tab 20*j* formed in coupling surface 20*i* of the base 20 therebetween. Moreover, the rear of the second portion 21*b* is bent downward to form the spacer tab 21*l*. The width of this spacer tab 21*l* is set to be slightly wider than the gap $d_1$ between the coupling surfaces 20*i* of the base 20. Assembling the heat conducting plate 21 with the base 20, the spacer tab 21*l* and the tab 21*k* transversely put the coupling surface 20*i* therebetween, while the surfaces, 21*i* and 21*s*, longitudinally put the coupling surface 20*i* therebetween. Thus, the heat-conducting plate 21 is assembled with the base 20 only by fitting the coupling surface 20*i* of the base 20 into the second portion 21*b* of the plate 21 without any screw, welding, or gluing, which enables to simplify the assembling process of the transceiver 1.

The area of the first portion 21*a* not overlaid by the second portion 21*b* mounts the supplementary substrate 18 as described later. One side of the first portion 21*a* is cut to pass the FPC board connecting the supplementary substrate 18 to the primary substrate 17.

Figure 10A:
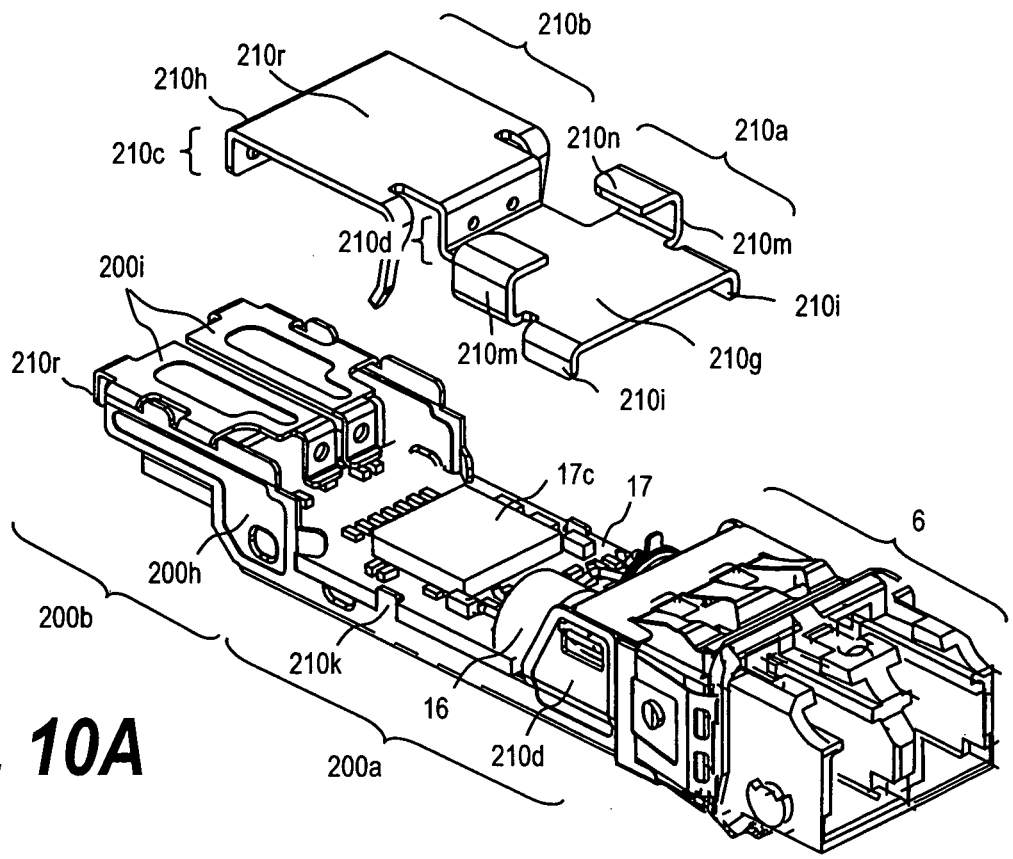
FIG. 10A illustrated a modified heat conducting plate to be assembled with the modified base.
Figure 10B:
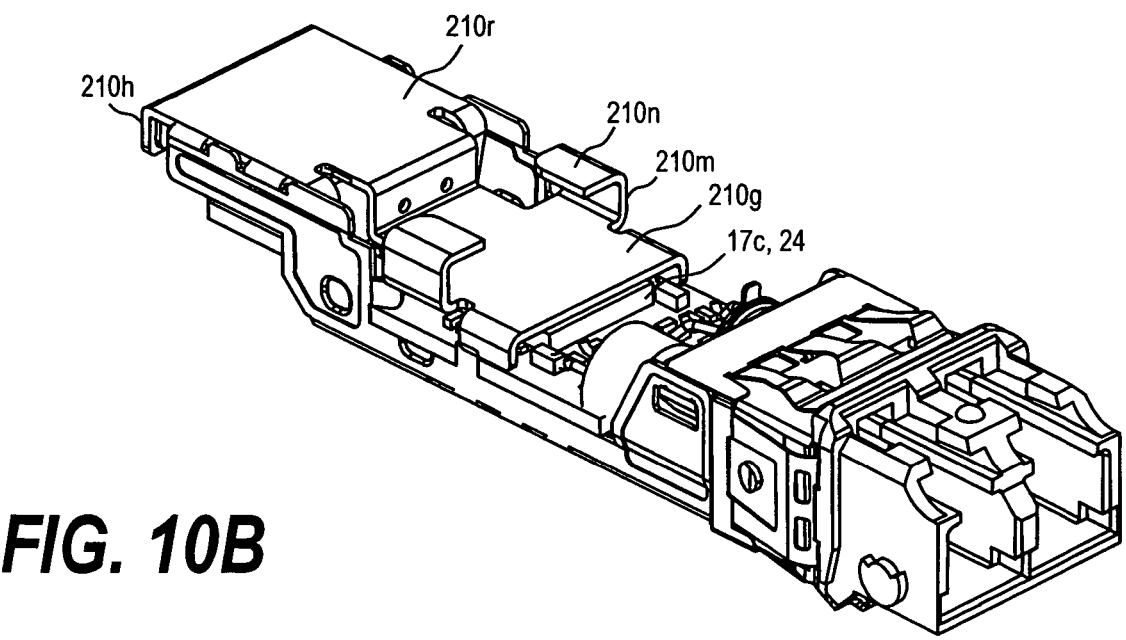
FIG. 10B illustrates the assembly of the modified heat conducting plate together with the modified base.

FIGS. 10A and 10B illustrate one modification of the base 20 and the heat conducting plate 21 shown in FIG. 5 and FIG. 9, respectively. The base 200 illustrated in FIG. 10A is configured in the coupling surface 200*i* to be wider than the surface 20*i* in the base 20 of FIG. 5A. The side cross section of the heat conducting plate 210 has a zigzag shape not the U-shaped configuration of the heat conducting plate 21. That is, the heat conducting plate 210 of this embodiment includes the first portion 210*a* coming in contact to the IC 17*c*, the fourth portion 210*d* bent upward at the rear end of the first portion 210*a*, the second portion 210*b* bent at the upper end of the fourth portion 210*d*, and the third portion bent downward at the rear end of the second portion 210*b*. The heat generated in the IC 17*c* is conducted to the first portion 210*a* via the thermal sheet 24, transferred in the heat conducting plate 210, and finally dissipated to the cage 2 at the rear end surface 210*h* of the third portion 210*c*.

Moreover, the third and fourth portions, 210*c* and 210*d*, configure to extend downward from the second portion 210*b* so as to put the coupling surface 200*i* therebetween. The whole coupling surface 200*i* of the base 200 comes in contact to the back surface of the second portion 210*b*. The first portion 210*a* forms legs 210*j* extending downward while supports 210*m* extending upward from the sides thereof. The tip of the support 210*m* becomes the abutting surface 210*n* to come in contact to the inside of the cover 23. The difference between two embodiments is that the present heat conducting plate 210 presupposes not to install the supplementary substrate 18. Although the first portion 210*a* has a space opened upward similar to the previous embodiment, this is for the direct contact of the heat conducting plate 210 to the IC 17*c* not to install the supplementary substrate 18.

Standards similar to those appeared in the previous embodiment may be applied for the selection of the material and its thickness for the heat conducting plate 210 of this embodiment. Further, the heat conducting plate 210 is also made from a metal plate only by cutting and bending without any welding and gluing. The plate 210 of this embodiment does not provide an overlaid portion, corresponding to the portion 21*f* in the previous embodiment, of the first portion 210*a* and the second portion 210*b*. Accordingly, the plate 210 may save the metal plate. The heat dissipating mechanism of this embodiment has the same efficiency with those in the previous embodiment.

Figure 11A:
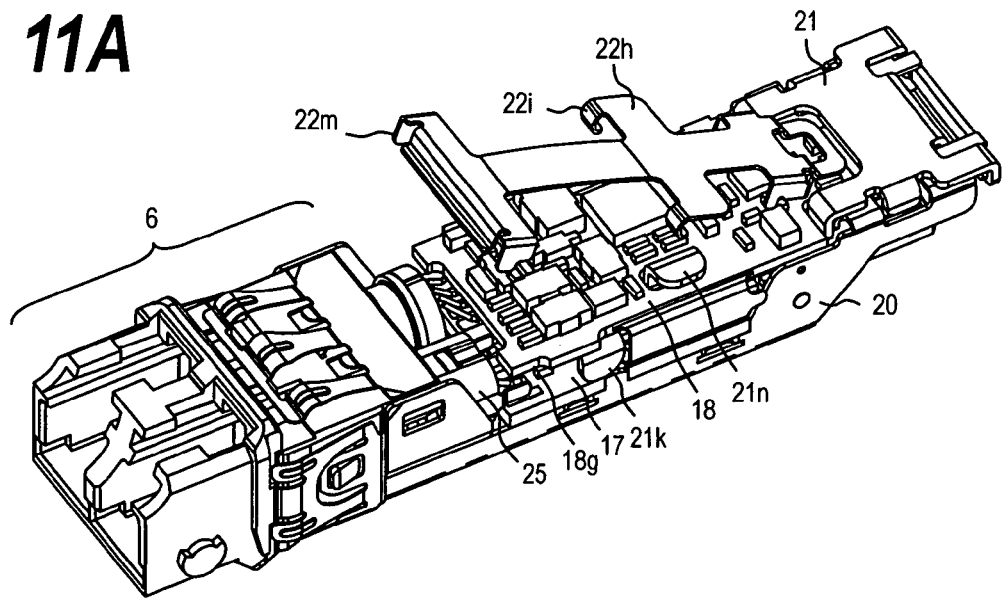
FIG. 11A illustrates the process for assembling the supporting plate with the body unit.
Figure 11B:
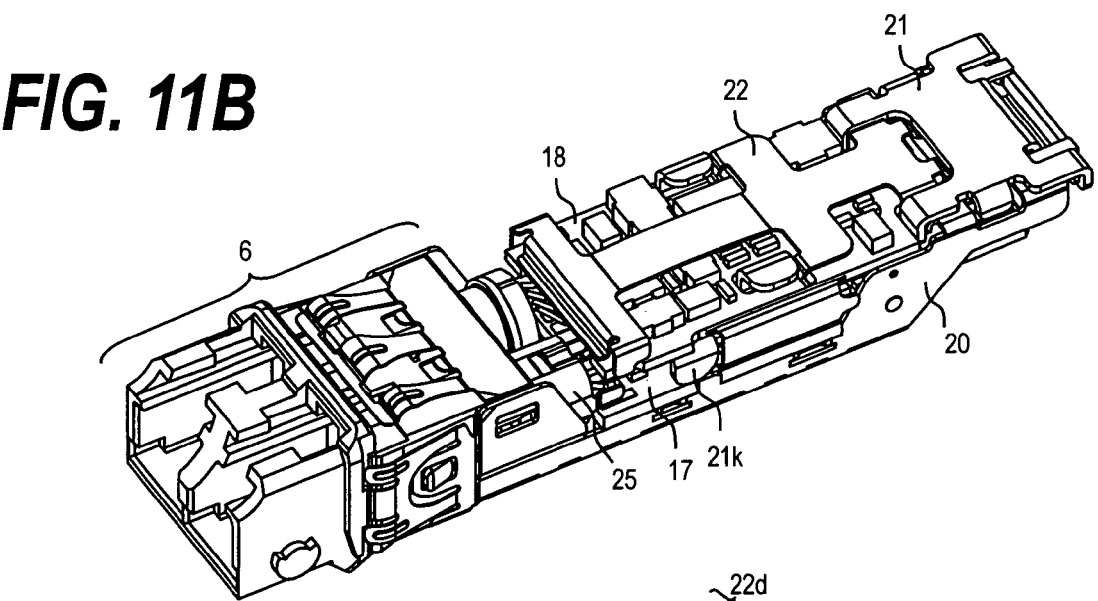
FIG. 11B illustrates the body unit with the supporting plate completed assembled to the body unit.

FIGS. 11A and 11B illustrate that, after installing the supplementary substrate 18 onto the first portion 21*a* of the heat conducting plate 21, the supporting plate 22 is set to hold the supplementary substrate 18. As shown in FIG. 5B, the FPC board 18*d* connects the supplementary substrate 18 to the edge of the primary substrate 17. Installing the primary substrate 17 on the first portion 20*a* of the base 20, and setting the heat conducting plate 21 on the primary substrate 17, the supplementary substrate 18 is set on the first portion 21*a* of the heat conducting plate 21 so as to fold the FPC board 18*d*. At that time, the support post 21*m* of the heat conducting plate 21 passes through the opening 18*e* in the supplementary substrate 18. The rear end 18*a* of the supplementary substrate is configured to protrude from the primary portion thereof, as shown in FIG. 5B, which fits into the cutting portion 21*q* of the heat conducting plate 21. Since the supplementary substrate 18 is not fixed to the plate 21, the supporting plate 22 assists to fix the supplementary substrate 18 to the plate 21. Moreover, the side of the FPC board 18*d* forms a projection 18*g*. This projection is inserted behind the coupling portion 20*h* at the assembling of the supplementary substrate 18 onto the heat conducting plate 21. Accordingly, this projection may prevent the cover 23 from scratching the edge of the FPC board 18*d* when setting the cover 23 to the body unit.

Figure 11C:
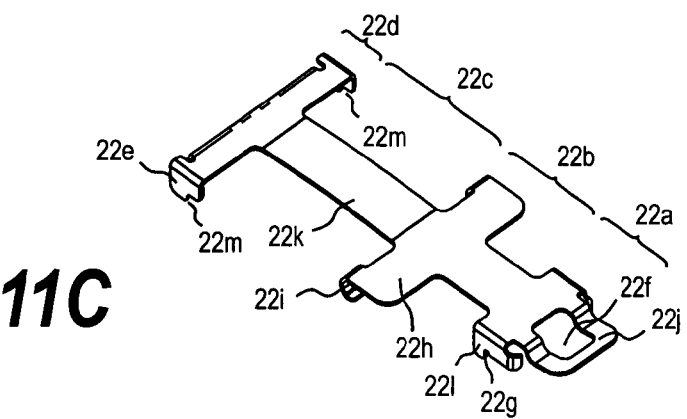
FIG. 11C illustrates the configuration of the supporting plate.

The supporting plate 22, as shown in FIG. 11C, is also made from a metal plate by cutting, bending, and tapping, and includes first to fourth portions, 22*a* to 22*d*. The first portion 22*a* forms an opening 22*f* and a step. The opening 22*f* softens the resilient force of the tip portion 22*j* that comes in contact to the back surface 21*s* of the heat conducting plate 21. The legs 22*l* in the first portion 22*a* form a step 22*m* by cutting a portion of the tip thereof, which inserts into the notch portion 18*f* of the supplementary board 18. Moreover, the tabs 22*i* of the second portion 22*b* comes in contact to the side of the support post 21*m* of the heat conducting plate 21, and the legs 22*e* in the fourth portion, 22*d* also forms a step 22*m* by cutting a portion of the tip thereof, which inserts into the cutting portion 18*g* formed in both front sides of the supplementary substrate 18. That is, the supporting plate 22 is assembled with the supplementary substrate 18 and the heat conducting plate 21 by three points, the steps, 22*g* and 22*m*, in the legs of the supporting plate and the tab 22*i*.

The third potion 22c that connects the second portion 22b to the fourth portion 22d configures in a beam to be bent outward by about 0.2 mm, which shows a resilient force. Putting the cover 23, the cover 23 in the center thereof comes in contact to and presses down this beam. Consequently, the fourth portion 22d of the supporting plate 22 is pressed downward to fix, by the tip 22m thereof, the supplementary substrate 18 to the heat conducting plate 21.

FIG. 12A illustrates the transceiver 1 including the OSA unit 6, the base 20, the primary and supplementary substrates, 17 and 18, the heat conducting plate 21 and the supporting plate 22, and completes the assembling thereof. The transceiver 1 shown in FIG. 12A further includes the actuator 12 in the front end thereof. Next, the actuator 12 and the configuration of the front side of the receptacle member 13 where the actuator 12 is assembled will be described as referring to FIGS. 12B to 12D.

FIG. 12B illustrates the actuator 12 from the bottom, while FIG. 12C shows the configuration of the upper surface of the actuator 12. The actuator 12 includes first to third portions, 12a to 12c, and is capable of rotating around the axis 12g formed in the third portion 12c, which makes a seesaw motion for the first and second portions, 12a and 12b, provided in both sides of the third portion 12c. The front end of the first portion 12a forms a pressing surface 12d, while both sides thereof configures inner and outer sliding surfaces, 12i and 12h, respectively. Rotating the bail 11, this rotational motion of the bail 11 may be converted to the up-and-down motion of the first portion 12a because two surfaces, 11f and 11h, of the bail 11 put these inner and outer sliding surfaces, 12h and 12i. That is, two surfaces, 11f and 11h, of the bail function as a cam. The second portion 12b provides an arm 12f and a projection 12e in the tip of this arm 12f. The projection 12e fixes the transceiver 1 to the cage 2 by engaging with the opening of the cage 2 and, by the seesaw motion of the actuator 12 due to the rotation of the bail 11, is brought inward to the transceiver 1, which enables to disengage the projection 12e with the opening and to release the transceiver 1 from the cage 2.

FIG. 12D illustrates the front configuration of the receptacle member 13. Two openings, the optical receptacles, 10a and 1b, receives the optical connector, and the TOSA 15 and the ROSA 16 installed on the other side of the receptacle member 13 may optically couple with the optical fiber attached to the optical connector. On the bottom of the receptacle member 13, in the center thereof, is configured with a projection 13e, whose section is semicircular, and, in both sides thereof, are configured with beaked hooks. On the other hand, the actuator 12 forms a hollow 12j in the center of the upper surface thereof to receive the center projection 13e of the receptacle member 13, and the axis 12g is fitted into the beaked hook 13f. The center projection 13e restricts the movement of the actuator 12 in the longitudinal direction, while the beaked hook 13f restricts the up-and-down motion thereof, accordingly, the actuator 12 may not be disassembled with the receptacle member 13. On the side walls of the receptacle member 13 are configured with the projection 13d, which becomes the axis for the rotation of the bail 11, as a portion 13p thereof is scooped.

Figure 13A:
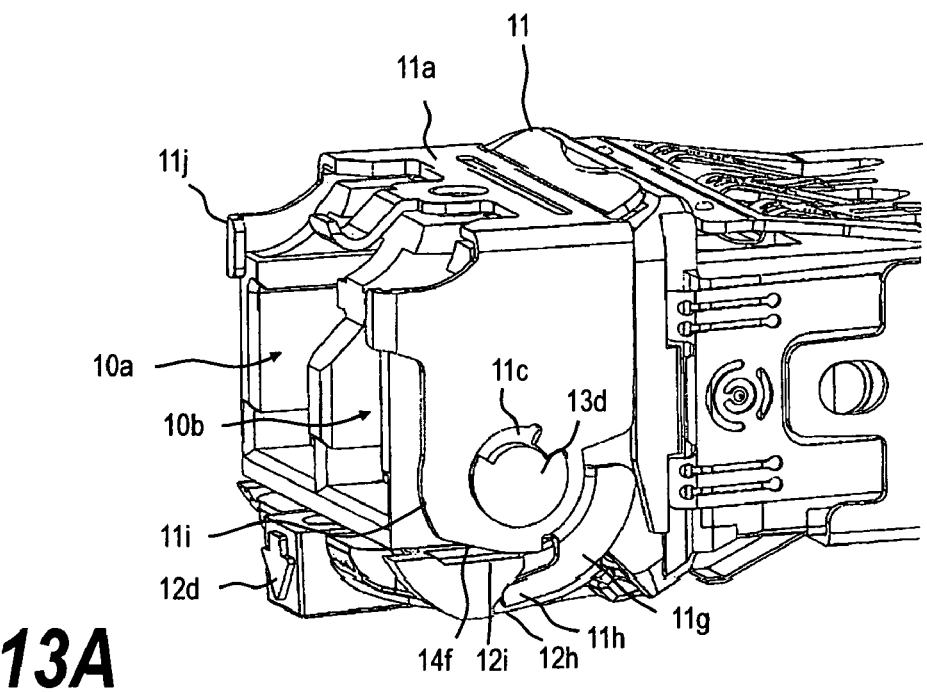
FIG. 13A illustrates the assembly of the receptacle member, the actuator, and the bail.
Figure 13B:
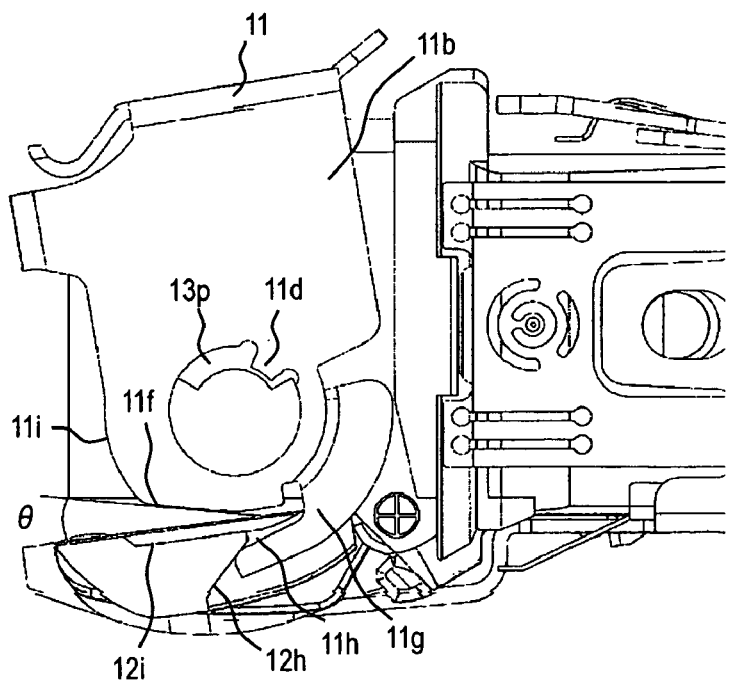
FIG. 13B is the bail slightly rotated.

FIG. 13A illustrates the bail 11 and the actuator 12, both assembled with the receptacle member 13, viewed from the front side, while FIG. 13B is a side view of these members. The bail 11 is a U-shaped member including a pair of legs 11b and a bridge 11a connecting these legs 11b. Although the following description primarily concentrates on the bail 11 made of metal by cutting and bending, the bail 11 may be made of resin. A center of the leg 11b forms an opening 11c to receive the projection 13d on the side wall of the receptacle member 13, a portion 11d of the edge thereof extrudes into the opening 11c and is set within the lacked portion 13p of the projection 13 to restrict the rotation of the bail 11.

Setting the bail in the neutral position, the initial position, the openings, 10a and 10b, of the optical receptacle wholly exposes not to be hidden by the bail 11. As shown in FIG. 13A, the sliding surface 11h and the cam surface 11f of the bail 11 put and come into contact to the inner and outer sliding surfaces, 12h and 12i. Rotating the bail 11, this rotational motion of the bail 11 operates to the actuator 12. That is, until the angle of the rotation e, the bail 11 makes no operation to the actuator 12. The angle e is determined when the cam surface 11f wholly comes in contact to the inner sliding surface 12i, as shown in FIG. 13B.

Further rotating the bail 11, the cam surface 11f presses down the inner sliding surface 12i, which continues until the outer surface 11i of the leg 11b comes in contact to the inner sliding surface 12i. Thus, by the first portion 12a of the actuator 12 pressing downward, the projection 12e in the second portion 12b is drawn up by the seesaw motion of the actuator 12, which may disengage the projection 12e with the opening of the cage 2.

Figures 14A, 14B:
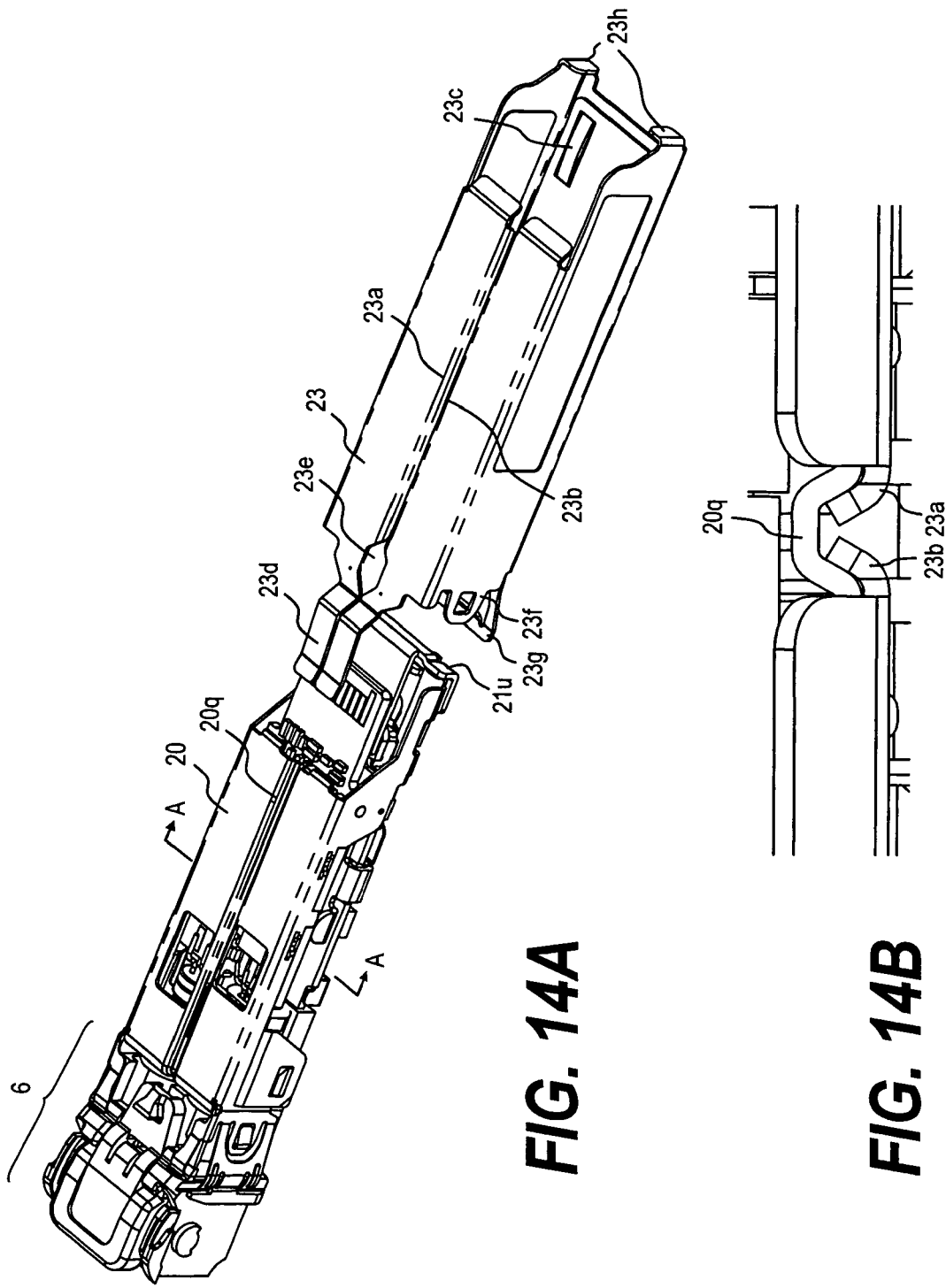
FIG. 14A illustrates the body unit and the cover to be set thereto.
FIG. 14b is a cross section taken along the line A-A in FIG. 14A.

During the rotation of the bail 11, the sliding surface 11h of the bail 11 supports the outer sliding-surface 12h of the actuator 12, consequently, the actuator 12 is inevitably connected with the bail 11. In other words, the actuator 12 makes the seesaw motion as the inner and outer sliding surfaces, 12h and 12i, are put between the cam surface 11f and the sliding surface 11h of the bail 11. Moreover, the cover 23 supports the actuator 12 by the fin 23d thereof extending from the front edge of the cover 23 (FIG. 14A). The projection 11d within the opening 11c of the leg 11b slides only in the lacked portion 13p of the projection 13d. This combination of the projection lid and the lacked portion 13p operates as the stopper for the rotation of the bail 11. When the bail 11 returns from the rotated position to the neutral position, the initial position in FIG. 13A, the operation mentioned above are performed in the opposite procedure.

In the description above, the bail 11 is rotated to disengage the transceiver 1 with the cage 2 by pulling the projection 12e inward. However, when the host system densely installs a plurality of cages 2 and the transceivers neighbor to the target transceiver receive the optical connector attached with the optical cable, a situation may occur that the bail can not rotate because the optical cables of the neighbor transceivers prevent from touching the bridge portion 11a of the bail 11. The transceiver of the present invention may exhibit the same function with the rotation of the bail 11 by pressing down the front end 12d of the actuator 12.

As shown in FIG. 13b, pressing the front end 12d of the actuator 12 downward, the outer sliding surface 12h pushes the sliding surface 11h of the bail 11 rearward, which influences the rotational moment on the bail 11. The combination of the conventional bail and the actuator may not convert the force downward for the actuator 12 into the rotational moment of the bail 11. The force applied to the actuator 12 may not convert to the rotational moment of the bail 11 because the bail itself operates as the stopper, thereby being unable to release the transceiver 1 from the cage 2. The mechanism provided in the present invention converts the force applied to the front end of the actuator 12 is adequately converted to the rotational motion of the bail 11, which enables the transceiver 1 to be released from the cage 2.

Figure 1A:
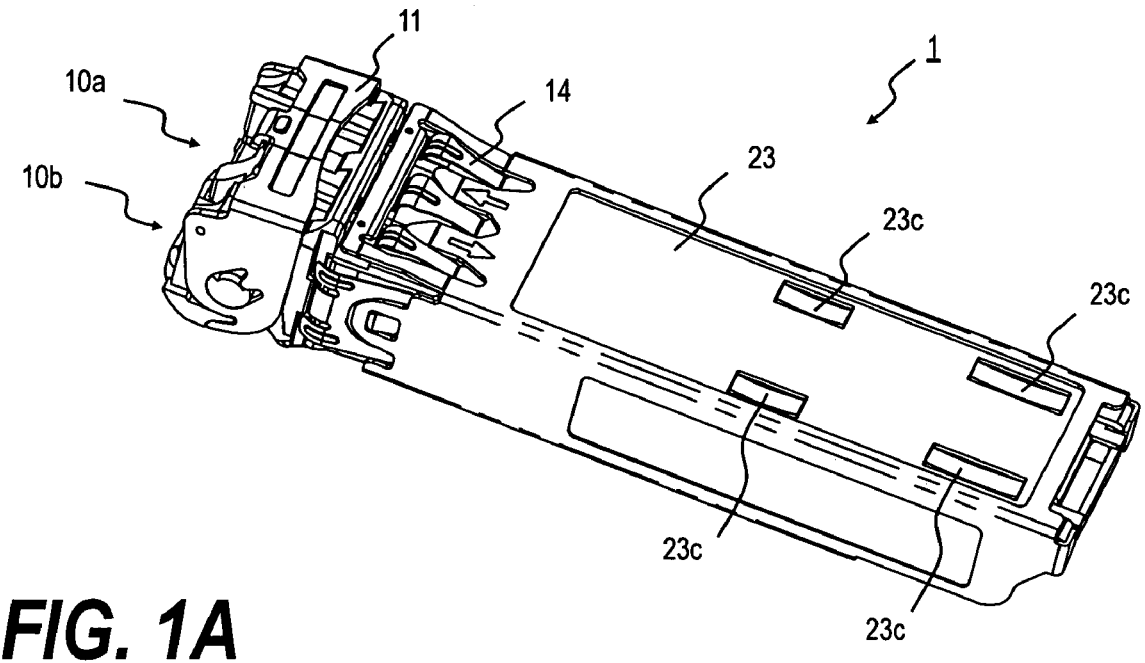
FIG. 1A illustrates the outside appearance of the pluggable transceiver of the present invention.
Figure 1B:
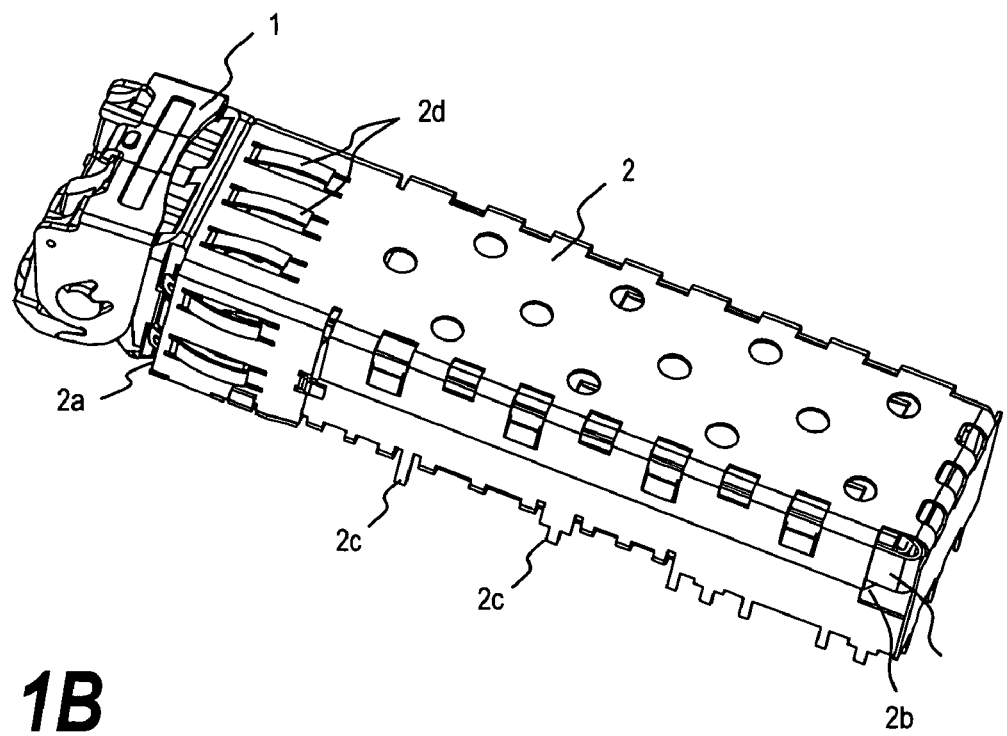
FIG. 1B illustrates the transceiver set within in the cage.

Recently, the pluggable transceiver 1 is proposed to be applied in the wavelength division multiplexed (WDM) system. In the WDM system using the pluggable transceiver, which provides functions of the optical transmission and the optical reception, the emission wavelength of the optical transmission function is set to be a preset value, and a plurality of optical signals each having the preset wavelength is transmitted by being multiplexed in the outside of the transceiver. In this case, each transceiver is inevitable to have an inherent emission wavelength. However, as shown in FIGS. 1 and 2, even the label attached in the upper or the side of the body records the information of the emission wavelength, it is unable to discriminate the information when the transceiver 1 is set within the cage 2. Accordingly, the present transceiver proposes a configuration that the bridge portion 11a of the bail 11 provides the colored identification, which enables to distinguish in visual the emission wavelength even when the transceiver 1 is in the cage 2.

According to the WDM communication standard in the wavelength band of 1.5 μm, the optical signals are divided into 64 channels by the interval of 0.8 nm, which corresponds to 100 GHz, and are multiplexed in the wavelength band from 1530 nm to 1650 nm. In order to distinguish respective wavelengths, the last two digits in the integer part and one digit after the decimal point, total three digits, may be marked in the color code. One example of color codes is shown in the following table:

TABLE

| Example of color code | |
|---|---|
| Number | Color |
| 0 | Black |
| 1 | Brown |
| 2 | Red |
| 3 | Orange |
| 4 | Yellow |
| 5 | Green |
| 6 | Blue |
| 7 | Magenta |
| 8 | Gray |
| 9 | While |

By spacing between the first two digits, which corresponds to the integer part, and the last one digit that corresponds to the one after the decimal points, the position of the decimal point may be distinguished. Such colored codes can be recognized when the bail 11 is rotated in front of the optical receptacles, 10a and 10b, even when the transceiver 1 is in the cage 2. In stead of spacing between the digits, to mark the identification may be recognizable to denote the position of the decimal point and to distinguish the emission wavelength. Moreover, three digits for the integer part, the total of four digits, may be applicable for the identification.

The cover 23 is made from a metal plate with a thickness of about 0.3 mm by cutting and bending without any welding and gluing. The metal used for the cover 23 may be stainless, iron or copper alloy. The cover 23 is fit from the rear side of the transceiver 1 to cover the body unit thereof exposing only the optical receptacle 10. The bottom of the cover 23 forms a slit with two edges, 23a and 23b, forming this slit are fitted within the rib 20q formed in the bottom 20g of the base 20, as shown in FIG. 14B. This configuration of the slit and the rib 20q strengthens the transceiver 1 against the stress despite the cover 23 is made from a metal plate by bending.

The cover 23 forms a large opening 23e in the front bottom to protrude the projection 12e of the actuator 12 to engage with the opening in the cage 2. The upper surface of the cover 23 forms a plurality of structures, as shown in FIG. 1A, which includes two slits parallel to each other and a portion between these two slits is bent inward. This bent portion has a resilient function and comes in contact to the second portion 21b and to the abutting surface 21n of the heat conducting plate 21 when the cover 23 is fit to the body unit. Consequently, the heat conducting plate 21 not only securely comes in contact to the IC 17c but also ensures the heat dissipation path from the heat conducting plate 21 to the cover 23.

Figure 15A:
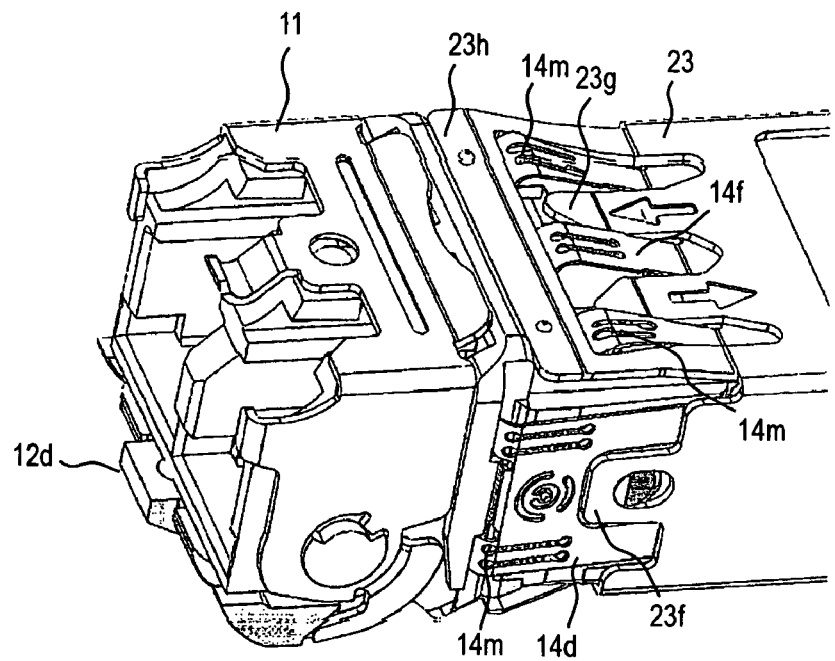
FIG. 15A illustrates the ground fin provided in the tip of the tab plate and that of the upper front of the cover.
Figure 15B:
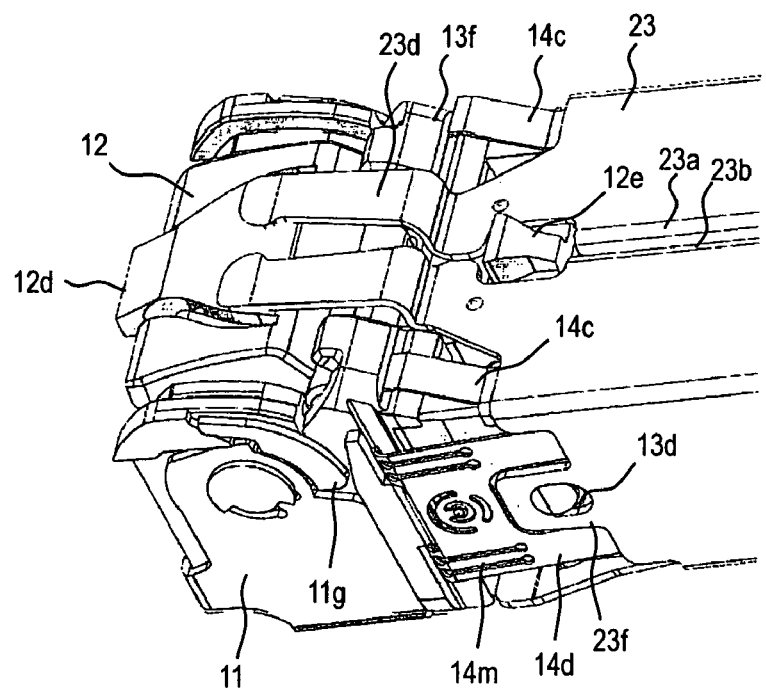
FIG. 15B illustrates the bottom front of the cover.

FIGS. 15A and 15B illustrate the front end of the transceiver 1 fitted with the cover 23. Fins, 14d and 14f, protrude from the front end of the cover 23. The upper of the transceiver 1 also forms the ground tab 23g that surrounds the fin 14f. In the midsection 14m of the fin 14f protrudes to securely come in contact to the inside of the cage 2. It may be applicable that this midsection 14m projects outward by forming two slits parallel to each other and surrounding the mid section 14m. That is, the fin 14f may be the double fin with the sub-fin 14m in the tip thereof. The double fin may have another slit connecting those two slits in the ends thereof. Moreover, another fin 14d may form the midsection protruding from the peripheral thereof, and the double fin structure 14m may be also applicable to this another fin 14d.

By applying such configuration to the fins, 14f and 14d, the transceiver 1 may securely come in contact to the cage 2. The multiple contacts of the fins, 14f and 14d, the double fin structure 14m, and the ground tab 23g of the cover 23 makes the contact of the transceiver 1 to the cage 2 secure. Since the cage 2 is made from a metal plate, the shape thereof is easily deformed. Even when the transceiver 1 is formed in firm, the secure contact between the transceiver 1 and the cage 2 may be performed if the cage 2 is deformed. The multiple contact of the present invention ensures the secure contact therebetween.

FIG. 15B illustrates the bottom of the front end of the transceiver 1. The fin 23d of the cover supports the actuator 12 and the projection 12e protrudes from the opening 23e. Moreover, the fin 14c protrudes from both sides of the fit 23d to set in the tip thereof within the groove at the boundary between the second and third portions, 13b and 13c, respectively, of the receptacle member 13. The side fin 14d of the tab plate 14 is also set within the groove at the boundary between second and third portions, 13b and 13c.

Next, an assembling process of the present optical transceiver will be described in sequence.

1. Assembling of the Receptacle Member with the Tab Plate

First, as shown in FIG. 3A, the tab plate 14 is attached to the receptacle member 13. As described previously, the second portion 14b of the tab plate 14 is folded twice to configure a U-shape cross section. The opening of this U-shaped second portion 14b receives the third portion 13c of the receptacle member 13. At that time, the latch 14k, which comes in contact to the TOSA 15 and the ROSA 16, is set in the groove 13n provided in the bottom of the U-shaped cutting. The tab plate 14 is assembled with the receptacle member 13 by engaging the latch tab 14e with the projection 13g in the side of the receptacle member 13.

2. Installing the OSAs

Next, as shown in FIG. 4A, the TOSA 15 and the ROSA 16 are installed in the receptacle member 13. Respective OSAs, 15 and 16, provide a pair of flanges, 15c and 16c, in the head portion thereof, 15d and 16d, which is the so-called sleeve. These flanges, 15c and 16c, sandwich the wall 13q there between that forms the U-shaped cutting. At that time, the tab plate 14 is sandwiched between the wall 13q and one of the flanges in respective OSAs, 15 and 16. The width of the U-shaped cutting in the tab plate 14 is configured to be slightly smaller than the diameter of the sleeves, 15d and 16d. Accordingly, although the OSAs are easily set within the cutting by deforming the tab plate 14, the OSAs once set are hard to be disassembled. On the other hand, the width of the U-shaped cutting of the receptacle member 13 is slightly wider than the diameter of the sleeve, accordingly, to set the OSAs, 15 and 16, within the receptacle member 13 may be carried out without any problem. The tab plate 14 may configure an identification mark in the side where the TOSA is to be installed to distinguish the TOSA 15 from the ROSA 16. The assembly of the OSA unit 6 has completed after installing the OSAs, 15 and 16, in the receptacle member 13 with the tab plate 14. The OSA unit 6 is illustrated in FIG. 4B.

3. Installing the Substrate in the Base

Next, the primary substrate 17, on which the electronic circuit is mounted in advance, is to be assembled with the base 20. Prior to the assembling of the substrate 17, the thermal sheet 27 is put on the portion where the TOSA is to be mounted and the insulating film 19 is attached to the supplementary substrate 18 in the surface opposite to the surface the electronic component is mounted (FIG. 5B).

The primary substrate 17 is temporarily fixed with the OSA unit 6. This temporal fixing is carried out by putting the substrate 17 between the lead pins, 15b and 16b, when the OSAs, 15 and 16, provide the lead pins, without soldering. While, when the OSAs, 15 and 16, are connected to the substrate 17 with the FPC board, the soldering between the FPC board and the substrate, and between the FPC board and the OSAs, 15 and 16, may be carried out. Occasionally, the OSAs, 15 and 16, soldered with the FPC board may be connected or soldered with the substrate 17 after assembling the OSA unit 6 with the base. Some fixture to assist the assembly of the OSA unit 6 with the base 20 may be utilized in this process.

Sliding the rear part of the substrate 17 under the coupling surface 20i of the base 20, the step 17d formed in the side of the substrate 17 abuts against the side of the coupling portion 20h, which automatically positions the substrate 17 on the base 20 in the longitudinal direction of the transceiver 1. Pressing down the substrate 17 as abutting against the coupling portion 20h, the projection 20k in the side 20c of the base 20 fits in the notch 17e formed in the side of the substrate 17. By configuring the width of the projection 20k slightly wider than that of the notch 17e, the relative position of the substrate 17 to the base 20 may be automatically and precisely determined. In such configuration, once fitting the substrate 17 in the base 20, the substrate 17 is hard to disassemble. A portion of the side 20c of the base 20 is bent inward to stabilize the position of the substrate 17 put thereon.

Figure 6A:
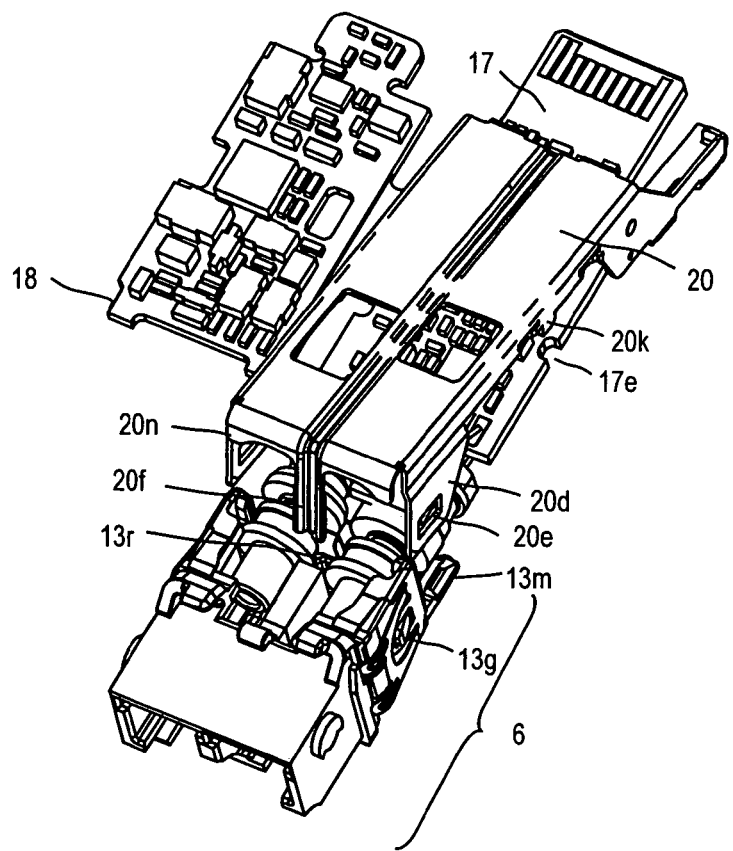
FIG. 6A is a downward view of the primary substrate temporarily installed with the OSAs and the base to be assembled with, and FIG. 6B is an upward view of the assembling process of the base with the primary substrate and the OSAs.
Figure 6B:
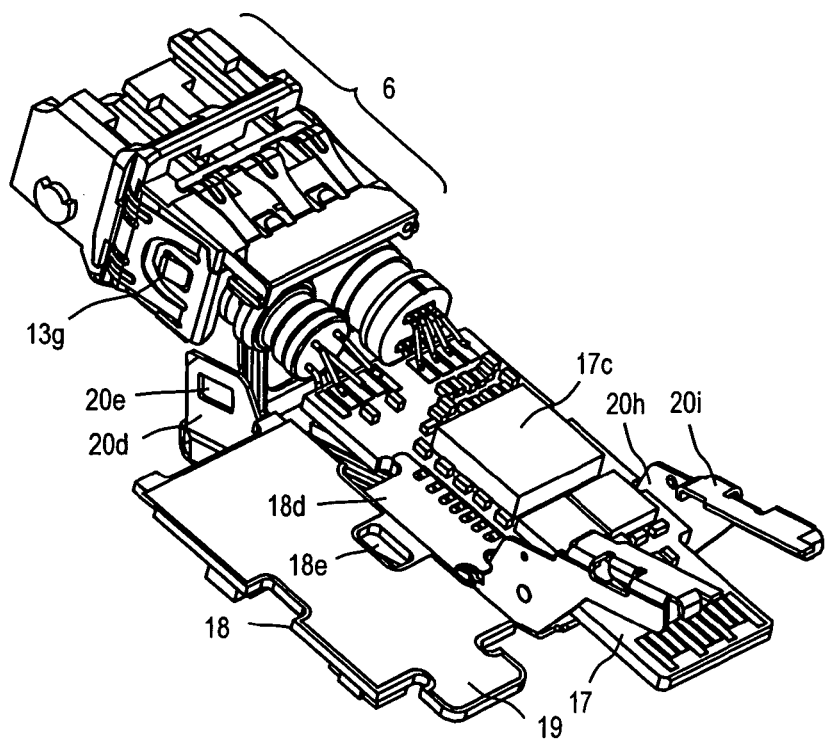
Figure 7A:
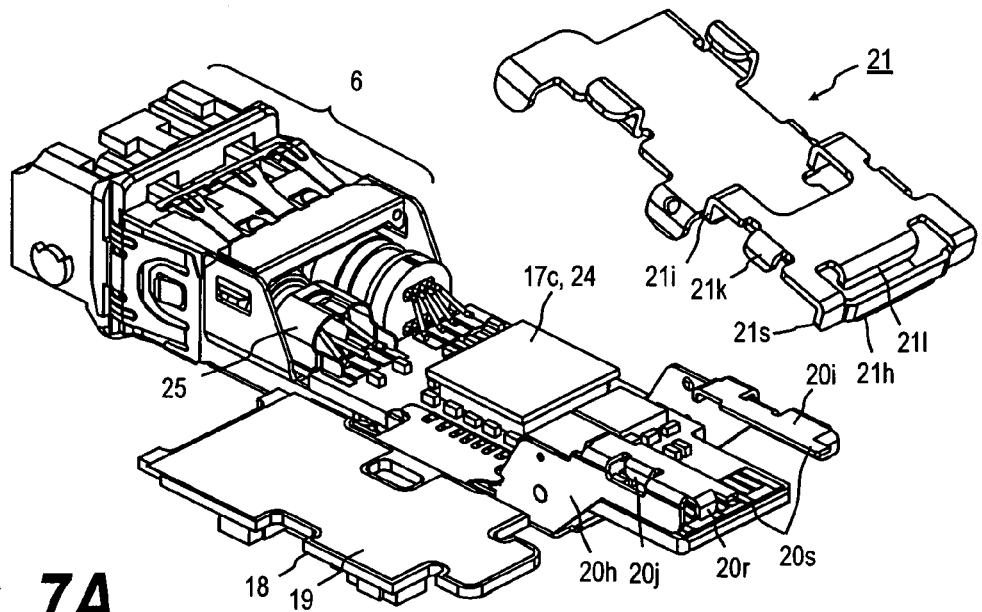
FIG. 7A illustrates the OSA unit assembled with the base and the primary substrate, and the heat conducting plate to be installed on the base.
Figure 7B:
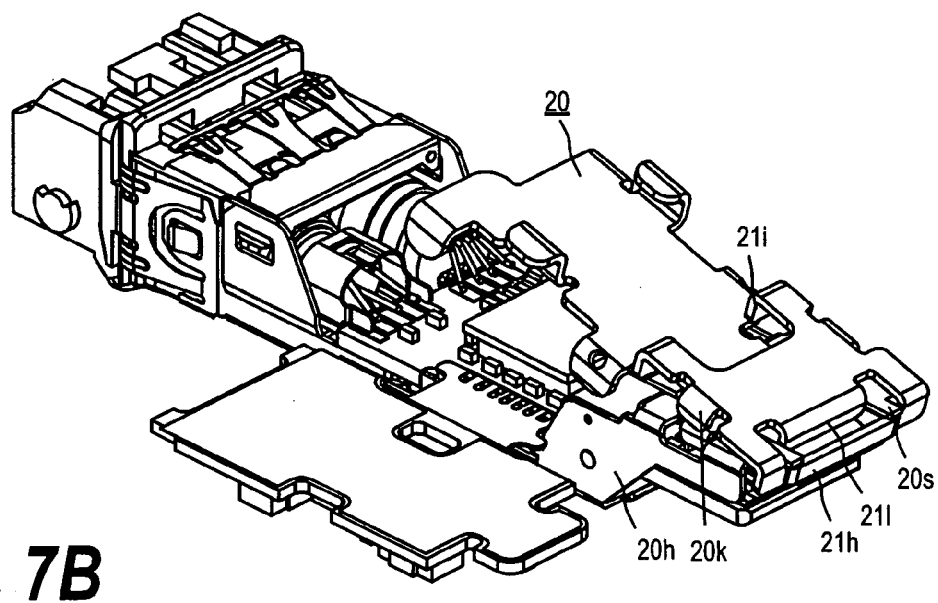
FIG. 7B illustrates a process for partially assembling the heat conducting plate on the base.
Figure 8A:
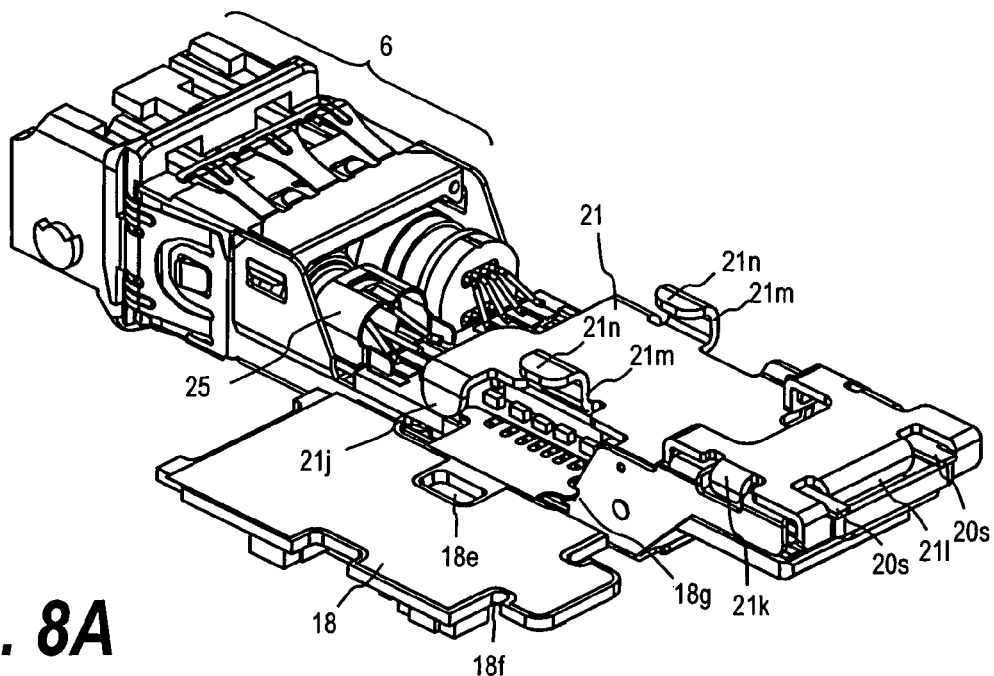
FIG. 8A illustrates the OSA unit, the base, the primary substrate, and the heat conducting plate assembled with, and FIG. 8B illustrates the assembly further installing the supplementary substrate on the heat conducting plate.
Figure 8B:
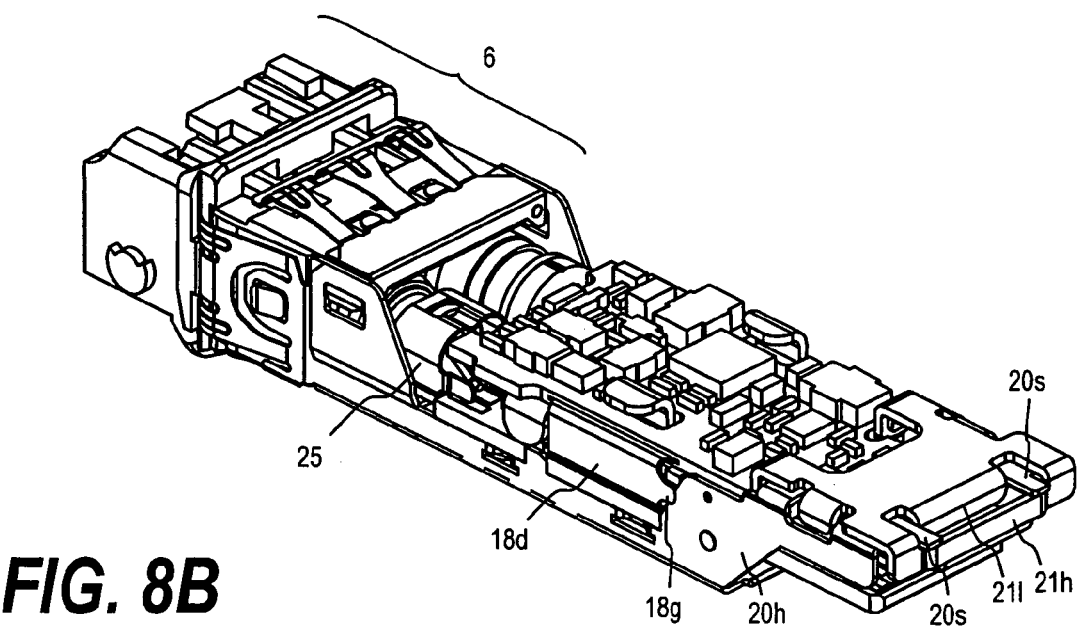

Subsequently, the OSA unit 6 is set to the base 20, as shown in FIGS. 6A and 6B. Pressing the base 20 downward, as the OSA unit 6 is temporarily fixed with the substrate 17, the projection 13m provided in the side of the OSA unit 6, practically provided in the side of the receptacle member 13, engages with the opening 20e of the support 20d. In the meantime of this engagement between the projection 13m and the opening 20e, the center post 20f formed in the front end of the base 20 inserts into the opening 13r in the center of the receptacle member 13. Thus, the OSA unit 6 is fixed to the base 20 by three positions, i.e., two positions in the side and one position in the front end thereof. Moreover, these three fixings are complementary to each other because the fixing in the side is between the convex in the OSA unit 6 and the concavity in the base 20, on the other hand, the fixing in the front end is between the concavity in the OSA unit 6 and the convex in the base 6. The bracket 25 is fit to the ROSA 16 after assembling the OSA unit 6 and the primary substrate 17 with the base 20.

4. Installing the Heat Conducting Plate

Next, the heat conducting plate 21 is installed on the base 20, which is illustrated in successive from FIG. 7A to FIG. 8B. First, the thermal sheet 24 is attached to the IC 17c in direct thereto or via some resin material with flexibility and good thermal conductivity to enhance the heat conductance to the heat conducting plate 21. Subsequently, inserting the rear end portion 20s of the base 20 into the opening between the surface 21h and the spacer tab 21l, of the heat conducting plate 21 and rotating the heat conducting plate 21 as touching the inner surface 21s of the third portion 21 to the surface 20r of the base 20, the surface 21i fits to the front end 20p of the coupling surface 20i. Moreover, the spacer tab 21l widens the gap between the coupling surface 20i while the legs 21k put the tabs 20j of the base 20 therebetween. That is, four sides, 21s, 21i and 21k, surrounding the second portion 21b of the plate 21 wrap and fit to the coupling surface 20i of the base 20. The first portion 21a of the plate 21 in the back surface 21e thereof comes in direct contact to the thermal sheet 24 on the IC 17c. The front legs 21j of the plate 21 presses down the primary substrate 17 by fixing the plate 17 to the base 20.

Thus, the assembly of the heat conducting plate 21 with the base 20 may be carried out without any screws only by mechanically fitting of two members using the resiliency inherently attributed to metal materials. Therefore, the present transceiver has the configuration quite superior productivity.

The heat generated in the IC 17c is conducted by the heat conducting plate 21 to the rear end of the transceiver 1, and finally dissipated to the cage 2 at the rear end surface 21h. A substantial gap-between the transceiver 1 and the cage is necessary to ensure the smooth insertion into/extraction from the cage 2. Therefore, even the heat generated within the transceiver 1 is effectively conducted to the cover 23; it is effective to radiate thus conducted heat to the cage 2. However, only the rear end of the transceiver 1 may touch to the cage 2 when the transceiver 1 is adequately set within the cage 2 and the plug of the transceiver 1 mates with the connector in the inner end of the cage 2. Accordingly, to conduct heat generated within the transceiver 1 to the rear end thereof may enhance the efficiency of the heat dissipation. The heat conducting plate adopted in the present transceiver 1 may provide a solution for the subject above mentioned.

5. Soldering of the Lead Pins

Next, the lead pins, 15b and 16b, extending from the OSAs, 15 and 16, are soldered with the primary substrate 17. The processes thus described determine the relative position of the primary substrate 17 and the OSA unit 6 through the base 20, accordingly, the soldering, which is a type of the permanent fixing, between the lead pins, 15b and 16b, and the electrodes, 17a and 17b, on the substrate 17 may be carried out. The OSAs, 15 and 16, are necessary to position relatively to the receptacle member 13 to provide the optical receptacle 10 following the standard. On the other hand, the primary substrate 17 is necessary to position relatively to the covet 23 to ensure the smooth insertion into the electrical connector provided in the inner end of the cage 2. Thus, to connect the substrate 17 with the lead pins, 15b and 16b, in permanent after the positions of the substrate 17 and the OSAs, 15 and 16, may prevent the mechanical distortion from localizing in the soldering point.

When the bracket 25 is attached to the ROSA 16, the soldering between this bracket 25 and the ROSA 16 is also carried out simultaneously to the soldering of the lead pins, 15b and 16b. When the FPC board is used for connecting to the substrate 17, the soldering thereof may be optionally carried out after the assembly of the OSA unit 6. The flexibility inherently attributed to the FPC board can compensate the positional discrepancy between the substrate 17 and the OSA unit 6. The soldering for the electrodes, 17a and 17b formed on the primary surface of the substrate 17 may be carried out in the portion exposed between the heat conducting plate 17 and the tab plate 14, while through the opening 20l formed in the bottom 20g of the base 20 for the electrodes in the back side of the substrate 17.

6. Installing the Supplementary Substrate

The supplementary substrate 18 connects to the one side edge of the primary substrate 17 with the FPC board 18d, namely, the FPC board 18d passes through the cutting portion 21p of the heat conducting plate 21 to connect to the primary substrate 17. The supplementary substrate 18 is installed on the heat conducting plate 21 in the first portion 21a thereof by folding the FPC board 18d as the support post 21m passes the opening 18e in the supplementary substrate 18. Since the back surface of the supplementary substrate 18 exposes the interconnections, the insulating film 19 is put thereon, as shown in FIG. 5B.

The supplementary substrate 18, which is installed on the first portion 21a, is fixed by the supporting plate 22, as shown in FIGS. 11A and 11B. The tip 21j of the first portion 21a of the supporting plate 22 is inserted under the second portion 21b from the cutting 21q as the fourth portion 22d is lifted up. The first portion 22a positions within the cutting 21q, and the step 22g in the leg 221 of the first portion 22a fit to the notch portion 18f of the supplementary substrate 18. Pressing down the second to fourth portions, 22b to 22d, the tab 22i in the second portion 22b abuts against the side of the support post 21m, and the step 22m in the leg 22e of the fourth portion 22d fits to the cutting 18g of the supplementary substrate 18. Therefore, the supporting plate 22 is assembled with the heat conducting plate 21 and the base 20 by the step 22g, the tab 22i and the step 22m. Setting the cover 23 to put the body unit of the transceiver 1 therein, the beam portion 22k bent upward by about 0.2 mm abuts against the inner surface of the cover 23 such that the cover 23 presses this beam portion 22k down, consequently, the supplementary substrate 18 is fixed to the heat conducting plate 21.

7. Assembling the Actuator

Next, the actuator 12 is attached with the transceiver 1 as shown in FIGS. 12B to 12D. The actuator 12, which is made of resin, is assembled with the receptacle member 13 with the axis 12g thereof being fit to the beaked hook 13f and the hollow 12j receiving the center projection 13e of the receptacle member 13. Sliding the actuator 12 on the bottom surface of the receptacle member 13 from the front side, the center projection 13e is set within the hollow 12j as deforming the beaked hook 13f and the projection 13e itself. In the same time, the axis 12g is set within the beaked hook 13f. Due to the tip shape of the beaked hook 13f, the actuator 12 one set within the hook 13f is hard to disassemble, namely, the actuator does not fall even the bottom of the transceiver 1 directs downward.

8. Setting the Cover

Prior to the setting of the cover 23, the thermal sheet 26 is attached, if necessary, to the portion of the TOSA 15 and the ROSA 16 exposed between the receptacle member 13 and the supplementary substrate 18. The thickness of this thermal sheet 26 is adjusted such that the top surface of the sheet 26 comes in directly contact to the ceiling of the cover 23 when the cover 23 is set to the body unit. The thermal sheet 26 may enhance the heat dissipating efficiency from the TOSA 15 and the ROSA to the cover 23. The heat thus conducted to the cover 23 may not only radiate to the cage 2 but also conduct to the rear end of the cover 23 and may be conducted to the inner end of the cage 2.

The cover 23 configures the latch tab 23f with an opening in both front sides thereof, as shown in FIG. 14A, while, forms the stopper 23h in the rear end. The opening provided in the latch tab 23f is to been gaged with the projection 13g provided in the side of the receptacle member 13. The cover 23 is set to the body unit such that the stopper 23h abuts against the outer side portion 21u of the rear end surface 21h. The fin 23d in the front bottom of the cover 23 extends forward, and the projection 12e formed in the actuator 12 protrudes from the opening 23e in the root of this fin 23d. The fin 23d supports the actuator 12.

As shown in FIG. 1, on the upper surface of the cover 23 is configured with the structure with two slits and the portion 23c between these slits being bent inward. This bent portion 23c comes in contact to the upper surface 21r and the abutting surface 21n of the heat conducting plate 21 to press the plate 21 downward. Since this bent portion 23c has an arched shape, it makes no problem for setting/removing the cover 23 from the body unit.

9. Installing the Bail

The bail 11 is attached to the receptacle member 13. The projection 13d in the sidewall of the receptacle member 13 inserts into the opening 11c formed in the leg portion 11b of the bail 11, as shown in FIGS. 13A and 13B. The attachment of the bail 11 can be easily carried out by spreading the leg portions 11b in outward. Setting the actuator 12 in the neutral position, the inner and outer sliding surfaces, 12i and 12h, is put between the cam surface 11f and the sliding surface 11h in the tip 11g of the leg 11b. The projection 12e of the actuator 12 can be simply pulled inward by rotating the bail 11 or by pressing the front end 12d of the actuator 12 downward, which may release the transceiver 1 from the cage 2.

Finally, labels, 28a to 28c, are stuck on the top and side surfaces of the transceiver 1 to complete the assembly. The label 28a on the top surface may be covered by a transparent film 28d to prevent thereof from peeling off by the insertion/extraction of the transceiver 1 to the cage 2.

The configuration and the assembling process of the present transceiver are thus described with referring to accompanying drawings. Since the present transceiver 1 assembles metal components made by cutting, bending or tapping the single metal plate and fits these metal components without any screws or other joining means, the cost not only the components themselves but also the assembling process can be reduced. Moreover, since the present transceiver 1 provides the heat conducting plate to dissipate heat from the IC 17c installed in the center of the transceiver 1 to the outside thereof, besides the heat conducting plate made of copper alloy, the heat dissipation efficiency can be enhanced for the transceiver 1 to be apply to the high speed application over GHz frequency band.

What is claimed is:

1. An optical transceiver capable of inserting into or extracting from a cage installed on a host system so as to expose one end portion thereof from a face panel of the host system to receive an optical connector and to provide an electrical plug in the other end thereof to be mated with the host system by a hot-pluggable configuration, the optical transceiver comprising:

an optical assembly unit including,
   an optical receptacle to receive the optical connector therein, and
   an optical subassembly having a semiconductor device therein to couple optically to an optical fiber secured in the optical connector; and
a body unit including,
   a substrate providing the electrical plug to mate with an electrical connector within the cage of the host system, and mounting an electronic circuit thereon electrically connected to the semiconductor device within the optical subassembly and the electrical plug,
   a heat conducting plate to be in contact with the electronic circuit,
   a metal base including first and second portions, the first portion mounting the substrate and the second portion being fitted to the heat conducting plate, and
   a metal cover for putting the optical subassembly, the substrate, the base and the heat conducting plate therein, wherein the optical subassembly, the substrate, the base and the heat conducting plate are arranged in longitudinal of the optical transceiver, wherein the heat conducting plate is in contact with the cage at a rear end of the optical transceiver to conduct heat generated in the electronic circuit to the cage, and wherein the heat conducting plate is in contact with the electronic circuit via a thermal sheet made of resin with a good thermal conductivity.

2. The optical transceiver according to claim 1, wherein the heat conducting plate includes first to third portions arranged longitudinally in this order, the first portion being configured to open upward to come in contact with the electronic circuit, the second portion being configured to open downward to fit the metal base thereto, the third portion being configured to come in contact with the cage at the rear end, and wherein the heat conducting plate has a zigzag shaped cross section.

3. The optical transceiver according to claim 1, wherein the heat conducting plate includes first to third portions, the first portion being in contact with the electronic circuit, the second portion being substantially parallel to the first portion and covering a rear portion of the first portion to fit the base thereto, and the third portion connecting the first portion to the second portion at the rear end of the transceiver to come in contact with the cage, and wherein the heat conducting plate has a U-shaped cross section.

4. The optical transceiver according to claim 3, wherein the heat conducting plate is formed by a metal plate by cutting, bending and tapping of copper based alloy.

5. The optical transceiver according to claim 1, wherein the metal cover provides a plurality of structures each including a pair of slits and a portion between the slits that is bent inward to form a bent portion coming in contact with the heat conducting plate.

6. The optical transceiver according to claim 5, wherein the heat conducting plate provides a support post with an abutting surface in a tip portion thereof, the bent portion of the cover being in contact with the abutting surface of the support post to conduct heat from the heat conducting plate to the cover.

7. An optical transceiver capable of inserting into or extracting from a cage installed on a host system so as to expose one end portion thereof from a face panel of the host system to receive an optical connector and to provide an electrical plug in the other end thereof to be mated with the host system by a hot-pluggable configuration, the optical transceiver comprising:

an optical assembly unit including, an optical receptacle to receive the optical connector therein, and an optical subassembly having a semiconductor device therein to couple optically to an optical fiber secured in the optical connector; and a body unit including, a substrate providing the electrical plug to mate with an electrical connector within the cage of the host system, and mounting an electronic circuit thereon electrically connected to the semiconductor device within the optical subassembly and the electrical plug, a heat conducting plate to be in contact with the electronic circuit, a metal base including first and second portions, the first portion mounting the substrate and the second portion being fitted to the heat conducting plate, and a metal cover for putting the optical subassembly, the substrate, the base and the heat conducting plate therein, wherein the optical subassembly, the substrate, the base and the heat conducting plate are arranged in longitudinal of the optical transceiver, wherein the heat conducting plate is in contact with the cage at a rear end of the optical transceiver to conduct heat generated in the electronic circuit to the cage, wherein the optical subassembly includes a stem for mounting the semiconductor device thereon, the stem being exposed between the optical receptacle and the substrate, and wherein the optical transceiver further includes a thermal sheet made of resin between the optical receptacle and the substrate to conduct heat from the stem to the cover.

8. An optical transceiver capable of inserting into or extracting from a cage installed on a host system so as to expose one end portion thereof from a face panel of the host system to receive an optical connector and to provide an electrical plug in the other end thereof to be mated with the host system by a hot-pluggable configuration, the optical transceiver comprising:

an optical assembly unit including, an optical receptacle to receive the optical connector therein, and an optical subassembly having a semiconductor device therein to couple optically to an optical fiber secured in the optical connector; and a body unit including, a substrate providing the electrical plug to mate with an electrical connector within the cage of the host system, and mounting an electronic circuit thereon electrically connected to the semiconductor device within the optical subassembly and the electrical plug, a heat conducting plate to be in contact with the electronic circuit, a metal base including first and second portions, the first portion mounting the substrate and the second portion being fitted to the heat conducting plate, and a metal cover for putting the optical subassembly, the substrate, the base and the heat conducting plate therein, wherein the optical subassembly, the substrate, the base and the heat conducting plate are arranged in longitudinal of the optical transceiver, wherein the heat conducting plate is in contact with the cage at a rear end of the transceiver to conduct heat generated in the electronic circuit to the cage, wherein the optical subassembly includes a stem for mounting the semiconductor device thereon, and wherein the optical transceiver further includes a thermal sheet made of resin and a metal bracket attached to the stem, the bracket being thermally in contact with the substrate and the cover via the thermal sheet put between the cover and the bracket.

* * * * *